US012775307B2

(12) United States Patent
Ji et al.

(10) Patent No.: US 12,775,307 B2
(45) Date of Patent: Oct. 27, 2026

(54) ELECTRONIC DEVICE INCLUDING STRUCTURE FOR SUPPORTING DISPLAY

(71) Applicant: Samsung Electronics Co., Ltd., Suwon-si (KR)

(72) Inventors: Youngmin Ji, Suwon-si (KR); Kwangtai Kim, Suwon-si (KR); Sanghyuk Park, Suwon-si (KR); Sungho Ahn, Suwon-si (KR); Donghyun Yeom, Suwon-si (KR); Sunggwan Woo, Suwon-si (KR); Soyoung Lee, Suwon-si (KR); Jihyung Jung, Suwon-si (KR); Seongdae Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 18/737,364

(22) Filed: Jun. 7, 2024

(65) Prior Publication Data

US 2024/0329688 A1 Oct. 3, 2024

Related U.S. Application Data

(63) Continuation of application No. PCT/KR2022/020221, filed on Dec. 13, 2022.

(30) Foreign Application Priority Data

Mar. 15, 2022 (KR) ........................ 10-2022-0032391
May 19, 2022 (KR) ........................ 10-2022-0061707

(51) Int. Cl.
*G06F 1/16* (2006.01)

(52) U.S. Cl.
CPC .......... *G06F 1/1652* (2013.01); *G06F 1/1624* (2013.01)

(58) Field of Classification Search
CPC .... G06F 1/1652; G06F 1/1624; G06F 1/1637; G06F 1/1656; G06F 1/1677; G06F 1/1681
See application file for complete search history.

(56) References Cited

U.S. PATENT DOCUMENTS 8,516,728 B2 * 8/2013 Jung ....................... G09F 9/301 40/607.01
9,519,313 B2 * 12/2016 Kim ........................ G06F 1/166
(Continued)

FOREIGN PATENT DOCUMENTS

CN 113824821 A 12/2021
JP 2021-107990 A 7/2021
(Continued)

OTHER PUBLICATIONS

International Search Report dated Mar. 17, 2023, issued in International Application No. PCT/KR2022/020221.
(Continued)

*Primary Examiner* — Rockshana D Chowdhury
(74) *Attorney, Agent, or Firm* — Jefferson IP Law, LLP

(57) ABSTRACT

An electronic device include a first housing; a second housing slidable with respect to the first housing along a first direction and a second direction opposite to the first direction; a flexible display in which a display region is expanded as the second housing moves in the first direction, or a display region is reduced as the second housing moves in the second direction; and a support disposed to the second housing to surround a periphery of the flexible display facing the first direction, and wherein the support includes a plurality of supporting protrusions in contact with the periphery of the flexible display, the plurality of supporting protrusions spaced apart from each other on an one surface of the flexible display.

20 Claims, 25 Drawing Sheets

(56) References Cited

U.S. PATENT DOCUMENTS

| | | | | |
|---|---|---|---|---|
| 10,111,346 | B2 * | 10/2018 | Seo | G06F 1/1624 |
| 10,396,843 | B2 | 8/2019 | Rayner | |
| 10,684,652 | B2 * | 6/2020 | Kim | G02F 1/133528 |
| 11,048,303 | B2 | 6/2021 | Kwak et al. | |
| 11,227,516 | B1 * | 1/2022 | Shin | G09F 9/30 |
| 11,444,260 | B2 * | 9/2022 | Choi | G06F 1/1637 |
| 11,543,859 | B2 * | 1/2023 | Kwak | G06F 1/1652 |
| 11,665,839 | B2 * | 5/2023 | Zeng | G06F 1/1637 361/807 |
| 11,689,651 | B2 * | 6/2023 | Feng | G06F 1/1624 455/566 |
| 11,723,162 | B2 | 8/2023 | Jin et al. | |
| 11,797,050 | B2 * | 10/2023 | Lim | G06F 1/1624 |
| 11,860,694 | B2 * | 1/2024 | Shin | G06F 1/1637 |
| 12,189,426 | B2 * | 1/2025 | Chung | G06F 1/1652 |
| 2011/0273826 | A1 * | 11/2011 | Misawa | G09F 11/02 361/679.01 |
| 2018/0077808 | A1 * | 3/2018 | Seo | G06F 1/1624 |
| 2018/0102072 | A1 * | 4/2018 | Lee | G02F 1/133305 |
| 2018/0103552 | A1 * | 4/2018 | Seo | G06F 1/1624 |
| 2019/0305237 | A1 * | 10/2019 | Shin | G06F 1/1601 |
| 2020/0314225 | A1 * | 10/2020 | Ahn | G06F 1/1652 |
| 2021/0098723 | A1 | 4/2021 | Shin et al. | |
| 2022/0322551 | A1 * | 10/2022 | Cheng | G06F 1/1624 |
| 2022/0361347 | A1 * | 11/2022 | Feng | G06F 1/1624 |
| 2023/0095247 | A1 * | 3/2023 | Feng | G06F 1/1624 361/679.27 |
| 2023/0266799 | A1 | 8/2023 | Kim et al. | |
| 2024/0097315 | A1 * | 3/2024 | Kim | H01Q 1/243 |
| 2024/0099049 | A1 | 3/2024 | Choi et al. | |

FOREIGN PATENT DOCUMENTS

| | | | |
|---|---|---|---|
| KR | 10-2011-0046045 | A | 5/2011 |
| KR | 10-2016-0118041 | A | 10/2016 |
| KR | 10-2017-0123904 | A | 11/2017 |
| KR | 10-2019-0113128 | A | 10/2019 |
| KR | 10-2020-0099762 | A | 8/2020 |
| KR | 10-2020-0100385 | A | 8/2020 |
| KR | 10-2021-0141185 | A | 11/2021 |
| KR | 10-2324508 | B1 | 11/2021 |
| KR | 10-2023-0076272 | A | 5/2023 |

OTHER PUBLICATIONS

European Search Report dated May 8, 2024, issued in European Application No. 22823313.6.

* cited by examiner

ELECTRONIC DEVICE INCLUDING STRUCTURE FOR SUPPORTING DISPLAY

CROSS-REFERENCE TO RELATED APPLICATION(S)

This application is a continuation application, claiming priority under § 365(c), of an International application No. PCT/KR2022/020221, filed on Dec. 13, 2022, which is based on and claims the benefit of a Korean patent application number 10-2022-0032391, filed on Mar. 15, 2022, in the Korean Intellectual Property Office, and of a Korean patent application number 10-2022-0061707, filed on May 19, 2022, in the Korean Intellectual Property Office, the disclosure of each of which is incorporated by reference herein in its entirety.

BACKGROUND

1. Field

Various embodiments relate to an electronic device including a structure for supporting a display.

2. Description of Related Art

In order for a user to easily carry an electronic device, the electronic device may be miniaturized. Despite miniaturization of the electronic device, a need for an electronic device in which the size of a display for displaying content may be changed is increasing, so that a user may receive various contents through the electronic device. For example, the electronic device may include a rollable device in which the size of the display exposed to the outside of the electronic device changes as the housing moves.

SUMMARY

In case that an electronic device is a rollable device, a display may be accommodated in a bent state in a housing. In case that the display includes a plurality of layers, as the display bends, a difference in curvature between the plurality of layers included in the display may occur. In case that a difference in curvature occurs between the plurality of layers, degree of deformation of the plurality of layers varies, and thus a part of the display may be lifted. The electronic device may need a structure for supporting the display.

The technical problems to be achieved in this document are not limited to those described above, and other technical problems not mentioned herein will be clearly understood by those having ordinary knowledge in the art to which the present disclosure belongs, from the following description.

According to an embodiment, an electronic device comprises a first housing; a second housing slidable with respect to the first housing in a first direction and a second direction opposite to the first direction; a flexible display coupled to the second housing so that a display region is expanded as the second housing slides in the first direction, or the display region is reduced as the second housing slides in the second direction. The electronic device comprises a support disposed in the second housing to surround a periphery of the flexible display facing the first direction. The support includes a plurality of supporting protrusions contacted on one surface of flexible display, and the plurality of supporting protrusions are spaced apart from each other on one surface of the flexible display.

According to an embodiment, an electronic device comprises a first housing; a second housing pulled out from the first housing by moving along a first direction with respect to the first housing, or inserted into the first housing by moving along the second direction opposite to the first direction; and a flexible display coupled to the second housing so that a display region is expanded as the second housing slides along the first direction, or the display region is reduced as the second housing slides along the second direction. According to an embodiment, the electronic device comprises a support disposed to the second housing to surround a periphery of the flexible display facing the first direction and including at least a part of a plurality of supporting protrusions in contact with an one surface of the flexible display, the plurality of supporting protrusions is spaced apart from each other on the one surface of the flexible display. The support further includes a first extending portion on which the plurality of the supporting protrusions formed, the first extending portion extending along the first direction; a second extending portion facing another surface of the flexible display facing the one surface of the flexible display, the second extending portion extending along the first direction; and a connecting portion connecting the first extending portion and the second extending portion.

An electronic device according to an embodiment can provide a structure for preventing a display from being lifted as the display is bent by a support supporting the display. The electronic device according to an embodiment can provide a structure that reduces damage to the display by preventing the display from being lifted by the support.

The effects that can be obtained from the present disclosure are not limited to those described above, and any other effects not mentioned herein will be clearly understood by those having ordinary knowledge in the art to which the present disclosure belongs, from the following description.

MODE FOR INVENTION

Figure 1:
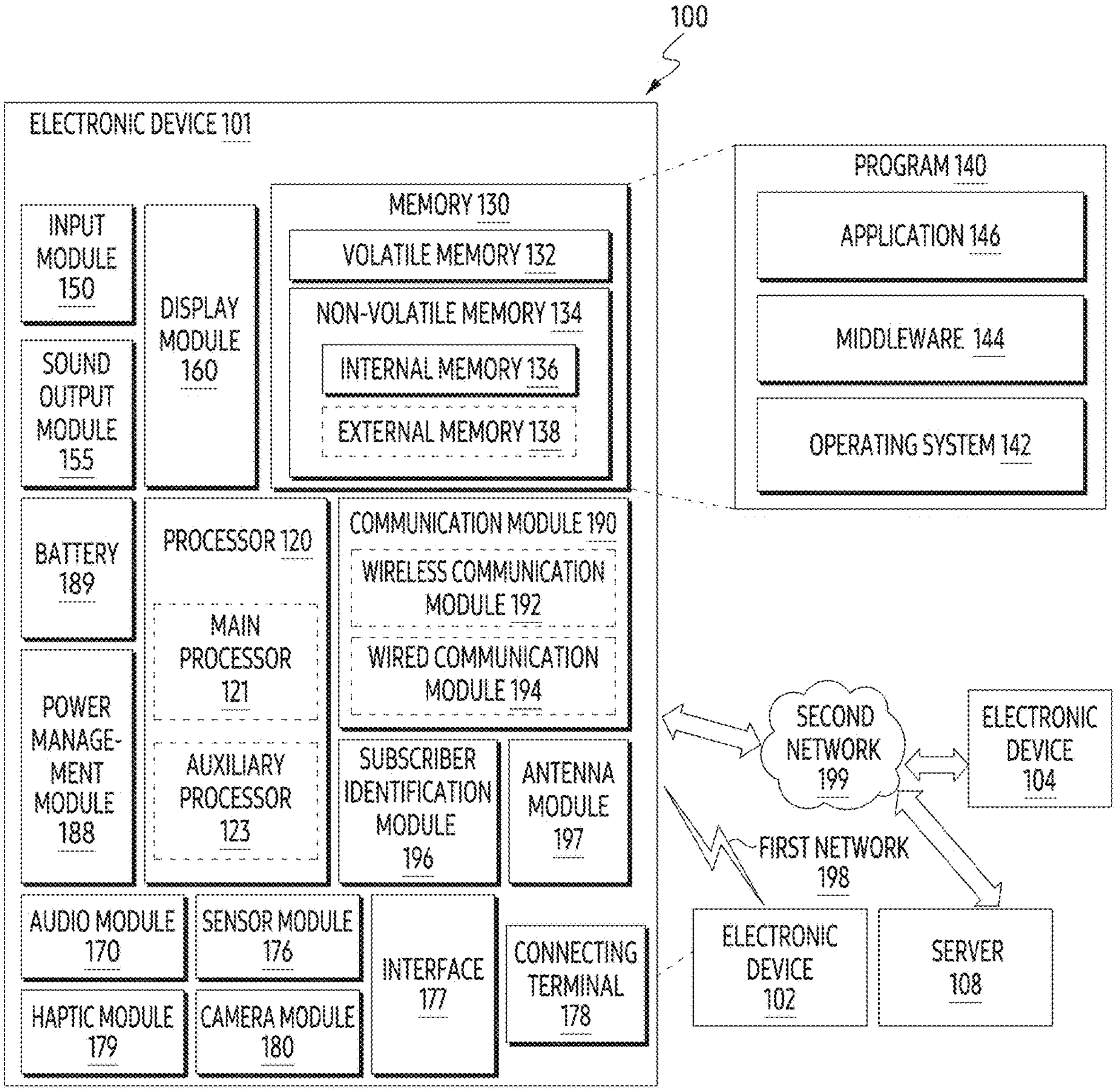
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
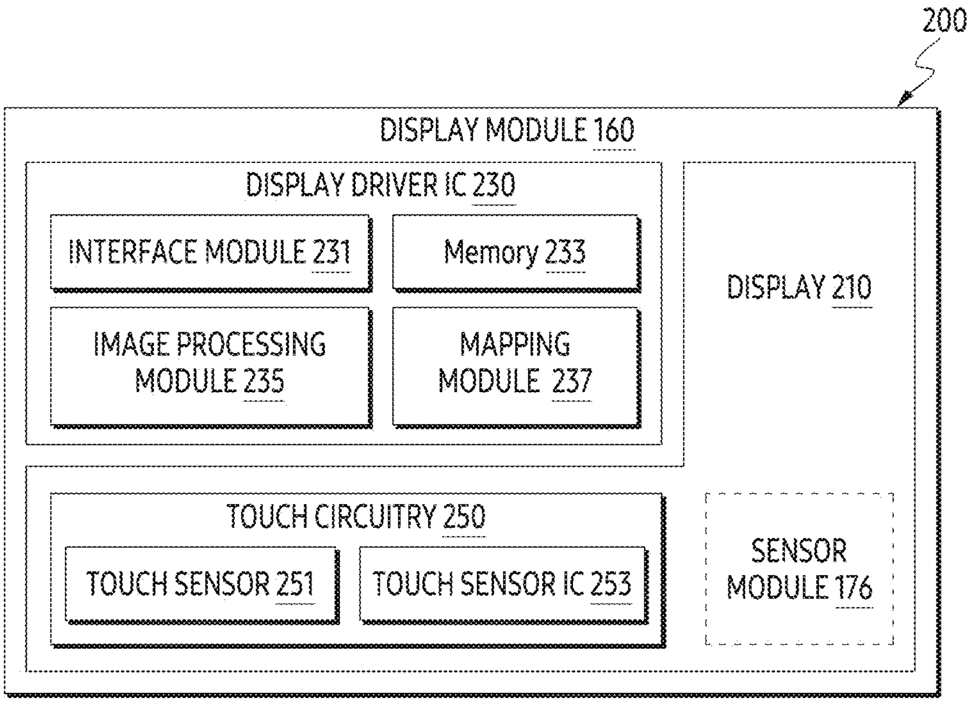
FIG. 2 is a block diagram illustrating a display module according to various embodiments.

FIG. 2 is a block diagram of the display device according to various embodiments.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
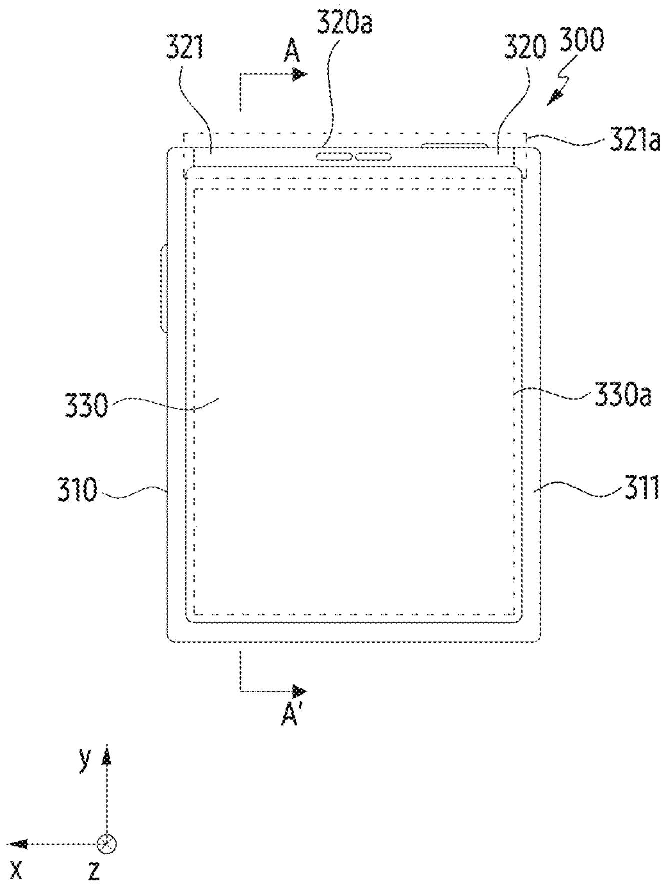
FIG. 3A is a front view of a first state of an electronic device according to an embodiment.
Figure 3B:
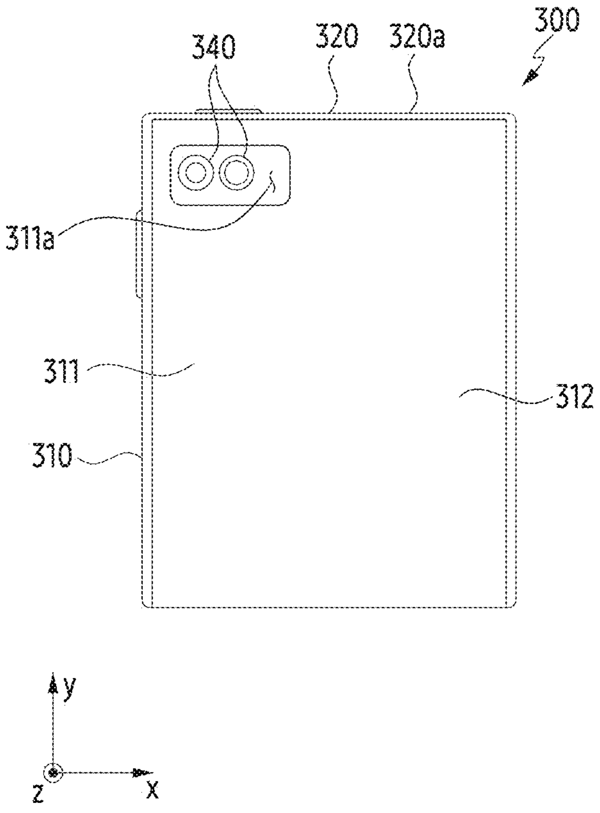
FIG. 3B is a rear view of a first state of an electronic device according to an embodiment.
Figure 3C:
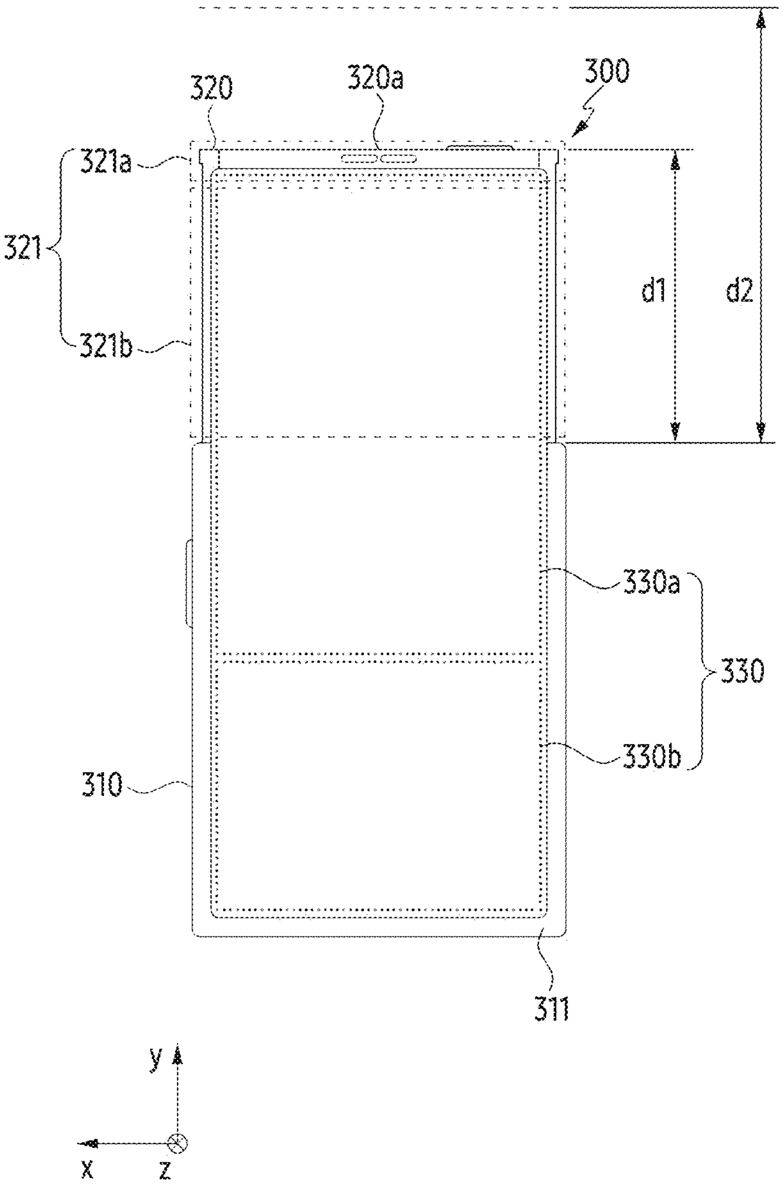
FIG. 3C is a front view of a second state of an electronic device according to an embodiment.
Figure 3D:
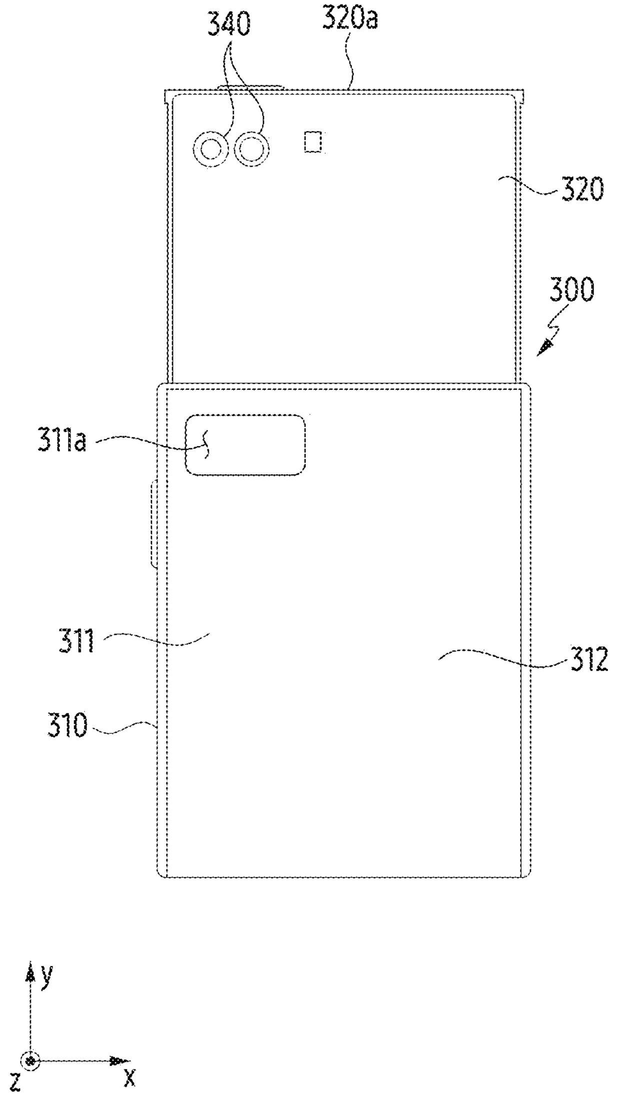
FIG. 3D is a rear view of a second state of an electronic device according to an embodiment.

FIG. 3A is a front view of a first state of an electronic device according to an embodiment, FIG. 3B is a rear view of a first state of an electronic device according to an embodiment, FIG. 3C is a front view of a second state of an electronic device according to an embodiment, and FIG. 3D is a rear view of a second state of an electronic device according to an embodiment.

Referring to FIGS. 3A, 3B, 3C, and 3D, an electronic device 300 (e.g., electronic device 101 of FIG. 1) according to an embodiment may include a first housing 310, a second housing 320, a display 330 (e.g., display module 160 of FIG. 1), and a camera 340 (e.g., camera module 180 of FIG. 1). According to an embodiment, the second housing 320 is slidable with respect to the first housing 310. For example, the second housing 320 may move in a range within a designated distance along a first direction (e.g., +y direction) with respect to the first housing 310. When the second housing 320 moves along the first direction, the distance between the side surface 320*a* of the second housing 320 facing the first direction and the first housing 310 increases. For another example, the second housing 320 may move in a range within a designated distance along a second direction (e.g., −y direction) opposite to the first direction with respect to the first housing 310. In case that the second housing 320 moves along the second direction, the distance between the side surface 320*a* of the second housing 320 facing the first direction and the first housing 310 decreases. According to an embodiment, the second housing 320 may perform a rectilinear reciprocating motion with respect to the first housing 310 by sliding relative to the first housing 310. For example, at least a part of the second housing 320 may be inserted into the first housing 310 or may be pulled out from the first housing 310. For example, at least part of the second housing 320 may be slid into the first housing 310 or may be slide out from the first housing 310.

According to an embodiment, the electronic device 300 may be referred to as a "slidable electronic device" as the second housing 320 is designed to be slidable with respect to the first housing 310. According to an embodiment, the electronic device 300 may be referred to as a "rollable electronic device" as at least a part of the display 330 is designed to be wound inside the second housing 320 (or the first housing 310) based on the slide movement of the second housing 320.

According to an embodiment, the first state of the electronic device 300 may be defined as a state in which the second housing 320 moves in the second direction (e.g., a contracted state or a slide-in state). For example, in the first state of the electronic device 300, the second housing 320 may be movable in the first direction but may not be movable in the second direction. In the first state of the electronic device 300, a distance between the side surface 320*a* of the second housing 320 and the first housing 310 may increase as the second housing 320 moves, but may not decrease. For another example, in the first state of the electronic device 300, a part of the second housing 320 may be pulled out into the first housing 310, but may not be inserted. According to an embodiment, the first state of the electronic device 300 may be defined as a state in which the second region 330*b* of the display 330 is not visually exposed from the outside of the electronic device 300. For example, in the first state of the electronic device 300, the second region 330*b* of the display 330 may be located inside the inner space (not illustrated) of the electronic device 300 formed by the first housing 310 and/or the second housing 320, and may not be visible from the outside of the electronic device 300.

According to an embodiment, the second state of the electronic device 300 may be defined as a state in which the second housing 320 moves in the first direction (e.g., an extended state or a slide-out state). For example, in the second state of the electronic device 300, the second housing 320 may be movable in the second direction but may not be movable in the first direction. In the second state of the electronic device 300, a distance between the side surface 320*a* of the second housing 320 and the first housing 310 may decrease as the second housing 320 moves, but may not increase. For another example, in the second state of the electronic device 300, a part of the second housing 320 may be inserted into the first housing 310, but may not be pulled out from the first housing 310. According to an embodiment, the second state of the electronic device 300 may be defined as a state in which the second region 330*b* of the display 330 is visually exposed from the outside of the electronic device 300. For example, in the second state of the electronic device 300, the second region 330*b* of the display 330 may be pulled out from the inner space of the electronic device 300 and visible from the outside of the electronic device 300.

According to an embodiment, in case that the second housing 320 moves in the first direction from the first housing 310, at least a part of the second housing 320 and/or the second region 330*b* of the display 330 may be pulled out from the first housing 310 by a pull-out length d1 corresponding to the moving distance of the second housing 320. According to an embodiment, the second housing 320 may reciprocate within a designated distance d2. According to an embodiment, the pull-out length d1 may have a size of approximately 0 to a designated distance d2.

According to an embodiment, the state of the electronic device 300 may be convertible between the second state and/or the first state by manual operation by a user or automatic operation by a driving module (not illustrated) disposed inside the first housing 310 or the second housing 320. According to an embodiment, the driving module may trigger an operation based on a user input. According to an embodiment, the user input for triggering the operation of the driving module may include a touch input, a force touch input, and/or a gesture input through display 330. According to another embodiment, the user input for triggering the operation of the driving module may include an audio input (voice input) or an input of a physical button exposed to the outside of the first housing 310 or the second housing 320. According to an embodiment, the driving module may be driven in a semi-automatic manner, in which an operation is triggered in case that a manual operation due to an external force of the user is detected.

According to an embodiment, the first state of the electronic device 300 may be referred to as a first shape, and the second state of the electronic device 300 may be referred to as a second shape. For example, the first shape may include a normal state, a reduced state, or a closed state, and the second shape may include an open state. According to an embodiment, the electronic device 300 may form a third state (e.g., an intermediate state) that is a state between the first state and the second state. For example, the third state may be referred to as a third shape, and the third shape may include a free stop state.

According to an embodiment, the display 330 may be visible or viewable from the outside through the front direction (e.g., the −z direction) of the electronic device 300 so that visual information may be displayed to the user. For example, display 330 may include a flexible display. According to an embodiment, the display 330 is disposed in the second housing 320 and may be pulled out from the inner space (not illustrated) of the electronic device 300 or may be inserted into the inner space of the electronic device 300 according to the movement of the second housing 320. The inner space of the electronic device 300 may refer to a space in the first housing 310 and the second housing 320 formed by the combination of the first housing 310 and the second housing 320. For example, in the first state of the electronic device 300, at least a part of the display 330 may be rolled into and inserted into the inner space of the electronic device 300. If the second housing 320 moves in the first direction in state that at least a part of the display 330 is inserted into the inner space of the electronic device 300, at least a part of the display 330 may be pulled out from the inner space of the electronic device 300. For another example, if the second housing 320 moves in the second direction, at least a part of the display 330 may be rolled into the inner space of the electronic device 300, thereby being inserted into the inner space of the electronic device 300. As at least a part of the display 330 is pulled out or inserted, the area of the display 330 visible from the outside of the electronic device 300 may be expanded or reduced. According to an embodiment, the display 330 may include a first region 330*a* and a second region 330*b*.

According to an embodiment, the first region 330*a* of the display 330 may refer to a region of the display 330 that may be fixedly visible outside the electronic device 300 regardless of whether the electronic device 300 is in a second state or a first state. For example, the first region 330*a* may refer to a partial region of the display 330 that is not rolled into the inner space of the electronic device 300. According to an embodiment, if the second housing 320 moves, the first region 330*a* moves together with the second housing 320. For example, if the second housing 320 moves along the first direction or the second direction, the first region 330*a* moves on the front surface of the electronic device 300 together with the second housing 320 along the first direction or the second direction.

According to an embodiment, the second region 330*b* of the display 330 is connected to the first region 330*a* and may be inserted into the inner space of the electronic device 300 or may be pulled out from the inner space of the electronic device 300 to the outside as the second housing 320 moves. For example, the second region 330*b* of the display 330 may be in a rolled state in the first state of the electronic device 300 and inserted into the inner space of the electronic device 300. The second region 330*b* of the display 330, in the first state of the electronic device 300, may not be visible from the outside by being inserted into the inner space of the electronic device 300. For another example, the second region 330*b* of the display 330, in the second state of the electronic device 300, may be a state pulled out from the inner space of the electronic device 300 in the second state of the electronic device 300. The second region 330*b* of the display 330 may be visible from the outside of the electronic device 300 in the second state.

According to an embodiment, in the first state of the electronic device 300, the area of the display 330 visible from the outside of the electronic device 300 may include only the first region 330*a* of the display 330. The area of the display 330 visible from the outside of the electronic device 300 in the second state of the electronic device 300 may include at least a part of the first region 330*a* and the second region 330*b* of the display 330.

According to an embodiment, the first housing 310 of the electronic device 300 may include a book cover 311 surrounding the inner space of the first housing 310 and a rear plate 312 surrounding the rear surface of the book cover 311. The second housing 320 of the electronic device 300 may include a front cover 321 surrounding an inner space of the electronic device 300.

According to an embodiment, the front cover 321 may include a first cover region 321*a* of the front cover 321 that is not inserted into the first housing 310 and a second cover region 321*b* that is inserted into or pulled out from the first housing 310. The first cover region 321*a* of the front cover 321 may always be visible regardless of whether the electronic device 300 is in the second state or the first state. The first cover region 321*a* of the front cover 321 may always be visible regardless of whether the electronic device 300 is in the second state or the first state. According to an embodiment, at least a part of the first cover region 321*a* of the front cover 321 may form a side surface 320*a* of the second housing 320. According to an embodiment, the second cover region 321*b* of the second housing 320 may not be visible in the first state, but may be visible in the second state.

The camera 340 may obtain an image of a subject based on receiving light from the outside of electronic device 300. According to an embodiment, the camera 340 may include one or a plurality of lenses, an image sensor, and/or an image signal processor. According to an embodiment, the camera 340 may be disposed in the second housing 320 to face the rear surface of the electronic device 300 opposite to the front surface of the electronic device 300 in which the first region 330*a* of the display 330 is disposed. For example, the camera 340 may be disposed on the front cover 321 of the second housing 320 and may be visible from the outside of the electronic device 300 through an opening 311*a* formed in the book cover 311 when the electronic device 300 is in the first state. For another example, the camera 340 is disposed on the front cover 321 of the second housing 320 and is covered by the book cover 311 and/or the rear plate 312 when the electronic device 300 is in the first state, so that it may not be visible from the outside of the electronic device 300.

According to an embodiment, the camera 340 may include a plurality of cameras. For example, camera 340 may include a wide-angle camera, an ultra-wide-angle camera, a telephoto camera, a proximity camera, and/or a depth camera. However, the camera 340 is not necessarily limited to including a plurality of cameras, and may include one camera.

According to an embodiment, the camera 340 may further include a camera (not illustrated) facing the front of the electronic device 300 in which the first region 330*a* of the display 330 is disposed. In case that the camera 340 faces the front of the electronic device 300, the camera 340 may be an under display camera (UDC) disposed under the display 330 (e.g., in the +z direction from the display 330), but is not limited thereto.

According to an embodiment, the electronic device 300 may include a sensor module (not illustrated) and/or a camera module (not illustrated) disposed under the display 330. The sensor module may detect an external environment based on information (e.g., light) received through the display 330. According to an embodiment, the sensor module may include at least one of a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, a motor encoder, or an indicator. According to an embodiment, at least some sensor modules of the electronic device 300 may be visually exposed from the outside through a partial region of the display 330. According to an embodiment, the electronic device 300 may detect a pull-out length (e.g., a length d1) using a sensor module. According to an embodiment, the electronic device 300 may generate pull-out information on the pull-out degree sensed by the sensor. For example, the electronic device 300 may detect and/or identify the pull-out degree of the second housing 320 using the pull-out information. According to an embodiment, the pull-out information may include information on a pull-out length of the second housing 320.

According to an embodiment, the coupling form of the first housing 310 and the second housing 320 is not limited to the shape and coupling illustrated in FIGS. 3A, 3B, 3C, and 3D, and may be implemented by a combination and/or coupling of other shapes or components.

Figure 4A:
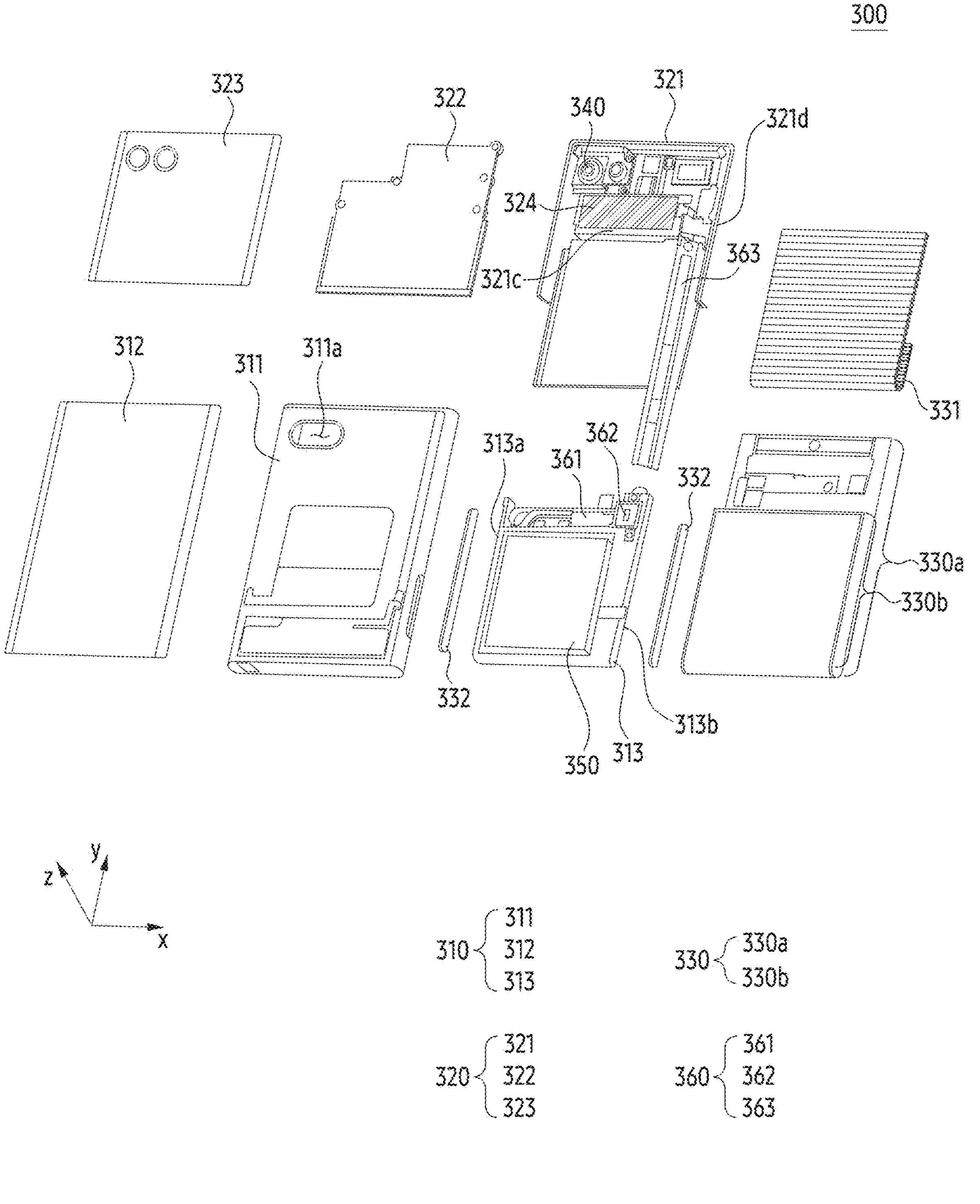
FIG. 4A is an exploded perspective view of an electronic device according to an embodiment.
Figure 4B:
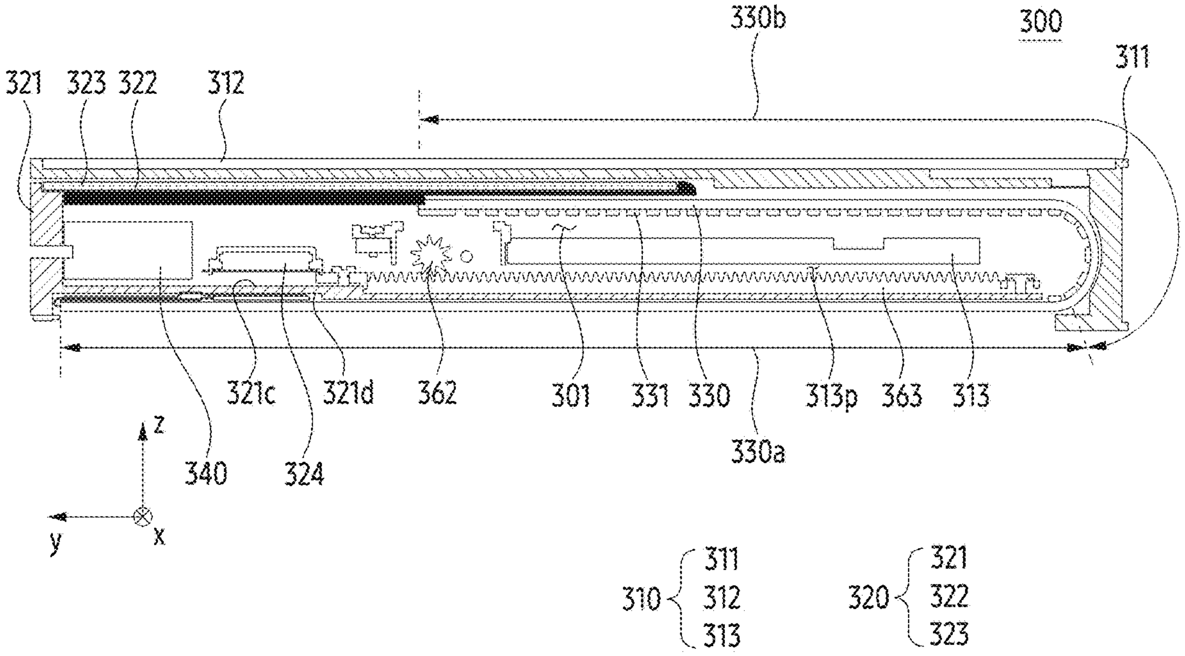
FIG. 4B is a cross-sectional view illustrating an example in which an electronic device according to an embodiment is cut along A-A' of FIG. 3A.

FIG. 4A is an exploded perspective view of an electronic device according to an embodiment, and FIG. 4B is a cross-sectional view illustrating an example in which an electronic device according to an embodiment is cut along A-A' of FIG. 3A.

Referring to FIGS. 4A and 4B, the electronic device 300 according to an embodiment may include a first housing 310, a second housing 320, a display 330, a camera 340, a battery 350 (e.g., the battery 189 of FIG. 1), and a driver 360. According to an embodiment, the first housing 310 and the second housing 320 may be coupled to each other to form an inner space 301 of the electronic device 300. For example, in the first state of the electronic device 300, the second region 330*b* of the display 330 may be accommodated in the inner space 301.

According to an embodiment, the first housing 310 may include a book cover 311, a rear plate 312, and a frame cover 313. According to an embodiment, the book cover 311, the rear plate 312, and the frame cover 313 included in the first housing 310 may be coupled to each other and may not move when the second housing 320 moves with respect to the first housing 310. According to an embodiment, the book cover 311 may form at least a part of an outer surface of the electronic device 300. For example, the book cover 311 may form at least a part of the side surface of the electronic device 300 and may form at least a part of the rear surface of the electronic device 300. According to an embodiment, the book cover 311 may provide a surface on which the rear plate 312 is seated. The rear plate 312 may be mounted on one surface of the book cover 311.

According to an embodiment, the frame cover 313 may support internal components of the electronic device 300. For example, the frame cover 313 may accommodate at least a part of the battery 350 and the driving unit 360. The battery 350 and the driving unit 360 may be accommodated in at least one of recesses or holes included in the frame cover 313. According to an embodiment, the frame cover 313 may be surrounded by the book cover 311. For example, in the first state of the electronic device 300, one surface 313*a* of the frame cover 313 on which the battery 350 is disposed may face the book cover 311 and/or the second region 330*b* of the display 330. For another example, in the first state of the electronic device 300, the other surface 313*b* of the frame cover 313 facing the one surface 313*a* of the frame cover 313 may face the first region 330*a* of the display 330 or the front cover 321. For example, the frame cover 313 may include aluminum as a material, but is not limited thereto.

According to an embodiment, the second housing 320 may include a front cover 321, a rear cover 322, and a slide cover 323. According to an embodiment, the front cover 321, the rear cover 322, and the slide cover 323 may be coupled to each other and may move together with the second housing 320 if the second housing 320 moves relative to the first housing 310. The front cover 321 may support internal components of the electronic device 300. For example, the printed circuit board 324 and/or the camera 340 on which electronic components (e.g., the processor 120 of FIG. 1) of the electronic device 300 are disposed may be disposed on one side 321*c* of the front cover 321 facing the inner space 301. The other surface 321*d* of the front cover 321 facing the one surface 321*c* of the front cover 321 may face the first region 330*a* of the display 330 when the electronic device 300 is in the first state. According to an embodiment, the rear cover 322 may be coupled to the front cover 321 to protect components of the electronic device 300 disposed on the front cover 321. For example, the rear cover 322 may cover a part of one surface 321*c* of the front cover 321. According to an embodiment, the slide cover 323 may be disposed on the rear cover 322 (e.g., +z direction) to form an outer surface of the electronic device 300 together with the rear plate 312 and the book cover 311. The slide cover 323 may be coupled to one surface of the rear cover 322 to protect the rear cover 322 and/or the front cover 321.

According to an embodiment, when the electronic device 300 is in the first state, the display 330 may be bent by at least partially being rolled into the inner space 301. According to an embodiment, the display 330 may cover at least a part of the frame cover 313 and at least a part of the front cover 321. For example, when the electronic device 300 is in the first state, the display 330 may cover the other surface 321*d* of the front cover 321, pass between the front cover 321, and the book cover 311, and extend toward the inner space 301. The display 330 may surround the frame cover 313 after passing between the front cover 321 and the book cover 311. The display 330 may cover one surface 313*a* of the frame cover 313 in the inner space 301. According to an embodiment, if the second housing 320 moves in the first direction, the second region 330*b* of the display 330 may be pulled out from the inner space 301. For example, as the second housing 320 moves in the second direction, the display 330 may pass between the front cover 321 and the book cover 311 and be pulled out from the inner space 301.

According to an embodiment, the electronic device 300 may include a supporting bar 331 for supporting the display 330 and a guide rail 332. For example, the supporting bar 331 may include a plurality of bars coupled to each other and may be manufactured in a shape corresponding to the shape of the second region 330*b* of the display 330. According to an embodiment, as the display 330 moves, the supporting bar 331 may move together with the display 330. According to an embodiment, in the first state in which the second region 330*b* of the display 330 is wound in the inner space 301, the supporting bar 331 may be wound in the inner space 301 together with the second region 330*b* of the display 330. As the second housing 320 moves in the first direction, the supporting bar 331 may move together with the second region 330*b* of the display 330. According to an embodiment, the guide rail 332 may guide the movement of the supporting bar 331. For example, as the display 330 moves, the supporting bar 331 may move along the guide rail 332 coupled to the frame cover 313. According to an embodiment, the guide rail 332 may be coupled to the frame cover 313. For example, the guide rail 332 may include a plurality of guide rails 332 disposed to be spaced apart from each other at both peripheries of the frame cover 313 spaced apart from each other along a third direction vertical to the first direction (e.g., the +x direction).

According to an embodiment, the driving unit 360 may provide a driving force to the second housing 320 so that the second housing 320 may move relative to the first housing 310. According to an embodiment, the driving unit 360 may include a motor 361, a pinion gear 362, and a rack gear 363. The motor 361 may receive power from the battery 350 to provide a driving force to the second housing 320. According to an embodiment, the motor 361 is disposed in the first housing 310 and may not move when the second housing 320 moves with respect to the first housing 310. For example, the motor 361 may be disposed in a recess formed in the frame cover 313. According to an embodiment, the pinion gear 362 is coupled to the motor 361 and may be rotated by a driving force provided from the motor 361. According to an embodiment, the rack gear 363 may engage with the pinion gear 362, and may move according to rotation of the pinion gear 362. For example, the rack gear 363 may linearly reciprocate in the first direction or the second direction according to the rotation of the pinion gear 362. According to an embodiment, the rack gear 363 may be disposed in the second housing 320. For example, the rack gear 363 may be coupled to the front cover 321 included in the second housing 320. According to an embodiment, the rack gear 363 may be movable inside the operating space 313*p* formed in the frame cover 313.

According to an embodiment, if the pinion gear 362 rotates in the first rotation direction (e.g., clockwise in FIG. 4B), the rack gear 363 may move in the first direction (e.g., the +y direction). If the rack gear 363 moves in the first direction, the second housing 320 coupled to the rack gear 363 may move along the first direction. As the second housing 320 moves along the first direction, an area of the display 330 visible from the outside of the electronic device 300 may be expanded. If the pinion gear 362 rotates in a second rotation direction (e.g., counterclockwise in FIG. 4B), the rack gear 363 may move in a second direction (e.g., −y direction). If the rack gear 363 moves along the second direction, the second housing 320 coupled to the rack gear 363 may move along the second direction. As the second housing 320 moves along the second direction, an area of the display 330 visible from the outside of the electronic device 300 may be reduced.

In the above description, although it has been described that the motor 361 and the pinion gear 362 are disposed in the first housing 310, and the rack gear 363 is disposed with the second housing 320, embodiments are not limited thereto. According to embodiments, the motor 361 and the pinion gear 362 may be disposed in the second housing 320, and the rack gear 363 may be disposed in the first housing 310.

For example, the display 330 may be bent to be expanded or reduced as the second housing 320 moves. As the display 330 bends, a plurality of layers included in the display 330 may bend with different curvature as the display 330 bends. In case that the curvature of a plurality of layers is different, the degree of deformation of the plurality of layers is changed, and thus both ends of the display 330 may be lifted. If both ends of the display 330 are lifted, the display 330 may be damaged by being separated from the designed position. In order to reduce damage caused by lifting of the display 330, the electronic device 300 may need a structure for supporting the display 330. Hereinafter, the electronic device 300 including a structure for supporting the display 330 will be described.

Figure 5A:
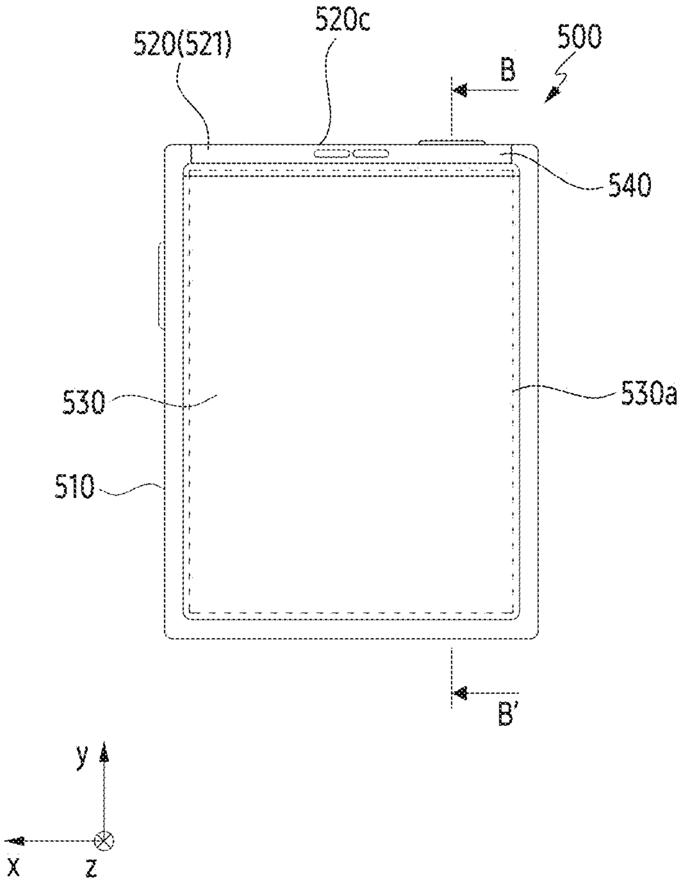
FIG. 5A is a front view of a first state of an electronic device according to an embodiment.
Figure 5B:
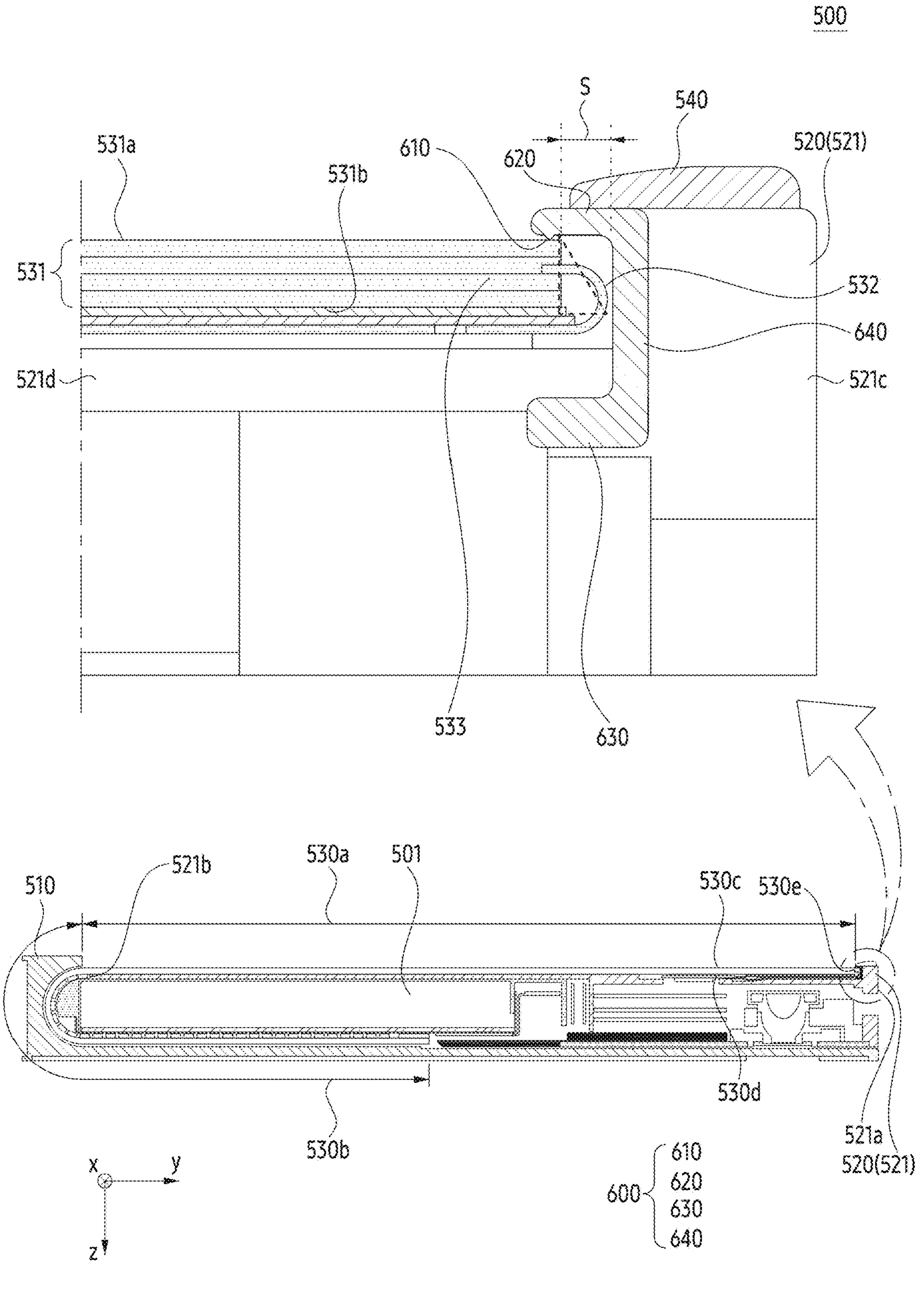
FIG. 5B is a cross-sectional view illustrating an example in which an electronic device according to an embodiment is cut along B-B' of FIG. 5A.

FIG. 5A is a front view of a first state of an electronic device according to an embodiment, and FIG. 5B is a cross-sectional view illustrating an example in which an electronic device according to an embodiment is cut along B-B' of FIG. 5A.

Referring to FIGS. 5A and 5B, according to an embodiment, the electronic device 500 (e.g., the electronic device 101 in FIG. 1, or the electronic device 300 in FIGS. 3A and 3B) may include a first housing 510, a second housing 520, a display 530, a decoration member 540, and a support 600. The first housing 510, the second housing 520, and the display 530 of FIGS. 5A and 5B may be substantially the same as the first housing 310, the second housing 320, and the display 330 of FIGS. 3A and 3B, and thus overlapping descriptions will be omitted.

According to an embodiment, the first housing 510 may form at least a part of an outer surface of the electronic device 500. When the second housing 520 moves, the first housing 510 may not move together with the second housing 520. According to an embodiment, the first housing 510 may accommodate at least a part of the second housing 520. For example, when the electronic device 500 is in the first state, the first housing 510 may surround at least a part of the second housing 520.

According to an embodiment, the second housing 520 is coupled to the first housing 510 to be slidable with respect to the first housing 510. The second housing 520 is movable in a first direction (e.g., +y direction) or a second direction opposite to the first direction (e.g., −y direction) with respect to the first housing 510. For example, the second housing 520 may be inserted into the first housing 510 as it moves in the first direction. As another example, the second housing 520 may be pulled out from the first housing 510 as it moves in the second direction.

According to an embodiment, the second housing 520 may include a side surface 520*c* facing the first direction. According to an embodiment, the distance between the side surface 520*c* of the first housing 510 and the second housing 520 may vary as the second housing 520 moves with respect to the first housing 510. For example, if the second housing 520 moves in the first direction, the distance between the first housing 510 and the side surface 520*c* of the second housing 520 may increase. For another example, if the second housing 520 moves in the second direction, the distance between the first housing 510 and the side surface 520*c* of the second housing 520 may decrease.

According to an embodiment, the first housing 510 and the second housing 520 may be coupled to each other to form an internal space 501 of the electronic device 500. The inner space 501 may provide a space in which various components of the electronic device 500 are mounted. For example, the inner space 501 may accommodate at least a part of the display 530.

According to an embodiment, the second housing 520 may include a front cover 521. The front cover 521 of FIG. 5A may be substantially the same as the front cover 321 of FIGS. 4A and 4B, and thus the overlapping descriptions will be omitted. The front cover 521 may form at least a part of the side surface 520*c* of the second housing 520. When the electronic device 500 is in the first state, at least a part of the front cover 521 may be inserted into the first housing 510. When the electronic device 500 is in the second state, at least a part of the front cover 521 may be pulled out from the first housing 510.

According to an embodiment, the front cover 521 may include a first periphery 521*a* facing the first direction and a second periphery 521*b* facing the second direction opposite to the first direction. The second periphery 521*b* may face the first periphery 521*a* and may be spaced apart from the first periphery 521*a* along the second direction. The periphery may refer to one region including a boundary distinguishing the one component from other components among regions included in one component, and the expression may be used in the same manner unless otherwise described below. For example, the first periphery 521*a* may include the side surface 520*c* of the second housing 520 and may refer to a part of the front cover 521 facing the first direction. For another example, the second periphery 521*b* may refer to another part of the front cover 521 facing the second direction opposite to the first direction.

According to an embodiment, the display 530 may be configured to provide visual information to a user of the electronic device 500. The display region of display 530 may refer to at least a part of display 530 that provides visual information to a user. For example, the display 530 may emit light through one surface 530*c* of the display 530 to provide visual information to the user. The other surface 530*d* of the display 530 facing the one surface 530*c* of the display 530 may face the front cover 521. According to an embodiment, if the second housing 520 moves, the display 530 may move together with the second housing 520. According to an embodiment, in the display 530, the display region may be expanded or reduced as the second housing 520 moves. The display 530 may be referred to, for example, as a flexible display. The expansion or reduction of the display region of the display 530 may mean that the area of the display region of the display 530 visible from the outside of the electronic device 500 is expanded or reduced as the second housing 520 moves. For example, the display region of the display 530 may be expanded as the second housing 520 moves in the first direction and may be reduced as the second housing 520 moves in the second direction.

According to an embodiment, the display 530 may include a first region 530*a* and a second region 530*b*. The first region 530*a* and the second region 530*b* of FIG. 5A may be substantially the same as the first region 330*a* and the second region 330*b* of FIGS. 3A, 3B, 4A, and/or 4B, respectively, and thus the overlapping descriptions thereof will be omitted. According to an embodiment, at least a part of the display 530 may be bent in the inner space 501. For example, when the electronic device 500 is in the first state, the first region 530*a* may be a shape extending from the first periphery 521*a* of the front cover 521. The first region 530*a* may have a linearly extended shape without substantially having a curvature. For example, the first region 530*a* may have a plane shape extending along the first direction from the second periphery 521*b*. The second region 530*b* connected to the first region 530*a* may be bent at the second periphery 521*b* of the front cover 521 to extend into the inner space 501 of the electronic device 500. For example, the second region 530*b* may have a curvature by being bent at the second periphery 521*b* of the front cover 521. The second periphery 521*b* of the front cover 521 may include a boundary dividing the first region 530*a* and the second region 530*b*. For example, the second region 530*b* of the display 530 spaced apart from the second periphery 521*b* of the front cover 521 in the second direction may not be supported by the front cover 521. As it is not supported by the front cover 521, the second region 530*b* may be bent and have a curvature.

According to an embodiment, the display 530 may include a display panel 531 and a board 532. The display panel 531 may include a plurality of layers stacked in order along a direction from the other surface 531*b* of the display panel 531 toward the one surface 531*a* of the display panel 531. For example, a plurality of layers may include a thin film transistor (TFT) and a light emitting layer including a plurality of pixels controlled by TFT. A plurality of pixels included in the light emitting layer may emit light toward one surface 531*a* of the display panel 531 based on a current or voltage supplied from the TFT. For example, one surface 531*a* of the display panel 531 may be substantially the same surface as one surface 530*c* of the display 530. According to an embodiment, a display driving integrated circuit (DDI) that controls the operation of the display panel 531 may be disposed on the other surface 531*b* of the display panel 531 facing one surface 531*a* of the display panel 531.

According to an embodiment, the board 532 may electrically connect the display panel 531 to the display driving circuit. The board 532 may extend from the side surface 531*c* of the display panel 531 toward the other surface 531*b* of the display panel 531. For example, the board 532 may protrude from the side surface 531*c* of the display panel 531 that is vertical to the one surface 531*a* of the display panel 531. The board 532 may protrude from the side surface 531*c* of the display panel 531 and may be bent toward the other surface 531*b* of the display panel 531. The board 532 may be connected to a display driving circuit disposed on the other surface 531*b* of the display panel 531 at the other surface 531*b* of the display panel 531. For example, the board 532 may include a material having flexibility, such as polyimide (PI), but is not limited thereto.

A decoration member 540 may cover the periphery 533 of the display 530 so that the periphery 533 of the display 530 is not visible from the outside of the electronic device 500. According to an embodiment, the decoration member 540 may be disposed in the second housing 520 to cover at least a part of the periphery 533 of the display 530 facing the first direction. According to an embodiment, the periphery 533 of the display 530 may include a side surface 530*e* of the display 530 facing the first direction, a part of the one surface 530*c* of the display 530 connected to the side surface 530*e* of the display 530, and a part of the other surface 530*d* of the display 530 connected to the side surface 530*e* of the display 530. A part of the periphery 533 of the display 530 covered by the decoration member 540 may include an inactive region of the display 530. For example, the inactive region of the display 530 may not include a pixel or may not emit light to the outside of the electronic device 500. According to an embodiment, the decoration member 540 may cover the support 600. For example, the decoration member 540 may be disposed on one surface of the support 600. According to an embodiment, the decoration member 540 may be coupled to the second housing 520 through an adhesive member having adhesive force, but is not limited thereto.

The support 600 supports the display 530. According to an embodiment, a part of the support 600 supports the display 530 by contacting the display 530. The support 600 includes at least one supporting protrusion 610 in contact with one surface 530*c* of the display 530. For example, the supporting protrusion 610 may extend in a direction (e.g., +z direction) from one surface 530*c* of the display 530 toward the other surface 530*d*. At least a part of the supporting protrusion 610 contacts the display 530, so that the supporting protrusion 610 supports the display 530. At least one supporting protrusion 610 is in contact with the periphery 533 of the display 530. According to an embodiment, the support 600 may be disposed in the second housing 520. For example, the support 600 may be disposed in the second housing 520 to surround the periphery 533 of the display 530 facing the first direction. For example, the support 600 may surround a part of the first region 530*a* of the display 530 close to the first periphery 521*a* among the first periphery 521*a* and the second periphery 521*b* of the front cover 521.

According to an embodiment, at least a part of the support 600 may overlap the periphery 533 of the display 530 when the display 530 is viewed from above (e.g., −z direction). As at least a part of the support 600 overlaps the periphery 533 of the display 530, the periphery 533 of the display 530 may not be visible when the display 530 is viewed from above (e.g., −z direction). For example, the support 600 may cover at least a part of the periphery 533 of the display 530 by surrounding at least a part of the periphery 533 of the display 530.

According to an embodiment, at least a part of the support 600 may support the front cover 521 of the second housing 520. For example, the front cover 521 of the second housing 520 may include a first covering portion 521*c* (e.g., first covering region 321*a* of FIG. 3C) in contact with one surface of the support 600 facing the first direction (e.g., +y direction) and a second covering portion 521*d* (e.g., second covering region 321*b* of FIG. 3C) coupled to the first covering portion 521*c*. The first covering portion 521*c* may be vertically coupled to the second covering portion 521*d*. The first covering portion 521*c* may be visible outside the electronic device 500 regardless of the state of the electronic device 500. For example, the first covering portion 521*c* may be visible outside the electronic device 500 regardless of whether the electronic device 500 is in the first state and the second state. The second covering portion 521*d* may be in contact with the display 530. For example, the second covering portion 521*d* may be in contact with the other surface 530*d* of the display 530. The second covering portion 521*d* may have a shape extending in the first direction parallel to the other surface 530*d* of the display 530. The support 600 may be in contact with the second covering portion 521*d* to support the second covering portion 521*d*.

According to an embodiment, the support 600 may pressurize a part of the periphery 533 of the display 530 spaced apart from the second region 530*b* of the display 530 having curvature. For example, a part of the periphery 533 of the display 530 pressed by the support 600 may refer to a part of the surface 530*c* of the display 530 adjacent to at least one protrusion 610. For example, the periphery 533 of the display 530 facing the first direction may be one region of the display 530 farthest from the second region 530*b* in which the display 530 has a curvature among the regions of the display 530. According to an embodiment, the support 600 may pressurize a part of the periphery 533 of the display 530 in a direction (e.g., +z direction) from one surface 530*c* of the display 530 toward the other surface 530*d* of the display 530. In case that the display 530 is bent, a plurality of layers included in the display 530, for example in the display panel 531, may be bent with different curvature. For example, in case that the display 530 is bent, the curvature of each of the plurality of layers of the display 530, in particular of the display panel 531, may decrease from one surface 531*a* of the display panel 531 toward the other surface 531*b* of the display panel 531. Due to a difference in curvature of each of the plurality of layers, relative displacement may occur in a state in which the plurality of layers are in contact, and a slip(s) may occur. If the slip(s) occurs, a repulsive force may be generated in the display 530 in a direction away from the second housing 520 (e.g., −z direction). Since the repulsive force due to slip increases as the display 530 moves away from the bent region, in case that the support 600 is not present, the display 530 may be separated from the second housing 520. The electronic device 500 according to an embodiment may provide a structure in which the display 530 is not separated by a support 600 that pressurizes a part of the periphery 533 of the display 530 farthest from the second region 530*b* having curvature.

According to an embodiment, the fact that the support 600 pressurizes a part of the periphery 533 of the display 530 includes the support 600 contacting a part of the periphery 533 of the display 530.

According to an embodiment, the support 600 may be made of a non-conductive material. The support 600 may be manufactured through an injection process. For example, the support 600 may include polycarbonate (PC). However, it is not limited thereto, and at least a part of the support 600 may be made of a conductive material.

According to an embodiment, the support 600 may include a first extending portion 620, a second extending portion 630, and a connecting portion 640. The first extending portion 620 may include at least one supporting protrusion 610 and may extend along the first direction. For example, the first extending portion 620 may extend along the first direction from the one surface 530*c* of the display 530 to contact the second housing 520. The second extending portion 630 may extend on the other surface 530*d* of the display 530 facing one surface 530*c* of the display 530. For example, the second extending portion 630 may face the other surface 530*d* of the display 530 and extend along the first direction to contact the second housing 520. The connecting portion 640 may connect the first extending portion 620 and the second extending portion 630. For example, the connecting portion 640 may be extended from the first extending portion 620, in a direction (e.g., +z direction) from one surface 530*c* of the display 530 vertical to the first direction (e.g., +y direction) toward the other surface 530*d* of the display 530, to the second extending portion 630. According to an embodiment, the connecting portion 640 may face the side surface 531*c* of the display panel 531.

According to an embodiment, the support 600 may surround a part of the board 532 protruding from the side surface 531*c* of the display panel 531. For example, the support 600 may be spaced apart from a part of the board 532 protruding from the side surface 531*c* of the display panel 531, and may surround a part of the board 532 protruding from the side surface 531*c* of the display panel 531. For another example, the connecting portion 640 of the support 600 may be spaced apart from the board 532 of the display 530 in the first direction (e.g., +y direction).

As described above, according to an embodiment, the electronic device 500 may provide a structure that prevents the display 530 from being separated from the second housing 520 by the support 600 supporting the display 530. For example, a support 600 that pressurizes a part of the periphery 533 of the display 530 spaced apart from the second region 530*b* having curvature may prevent the display 530 from being separated from the second housing 520.

Figure 6A:
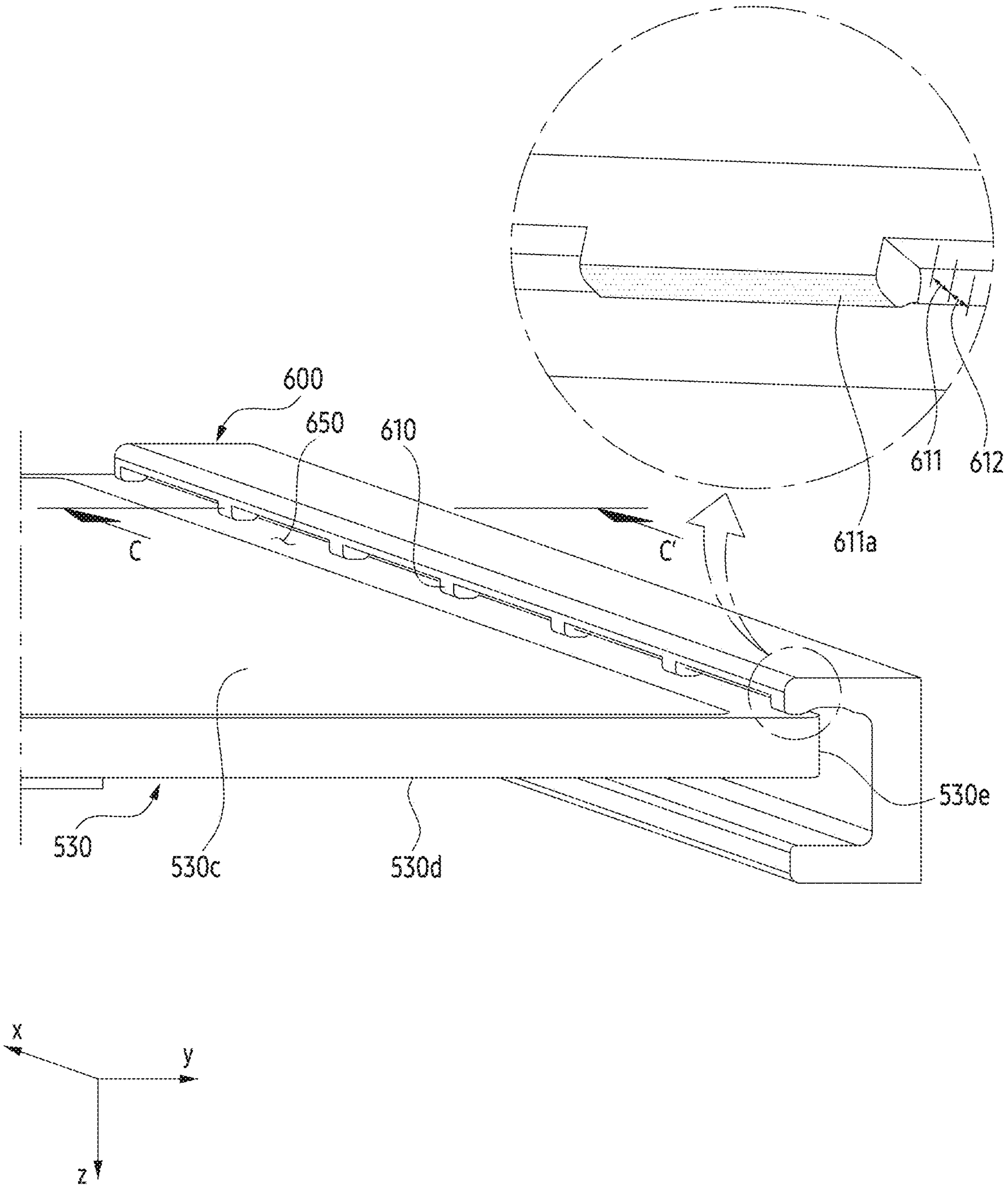
FIG. 6A is a perspective view of a display and a support of an electronic device according to an embodiment.
Figure 6B:
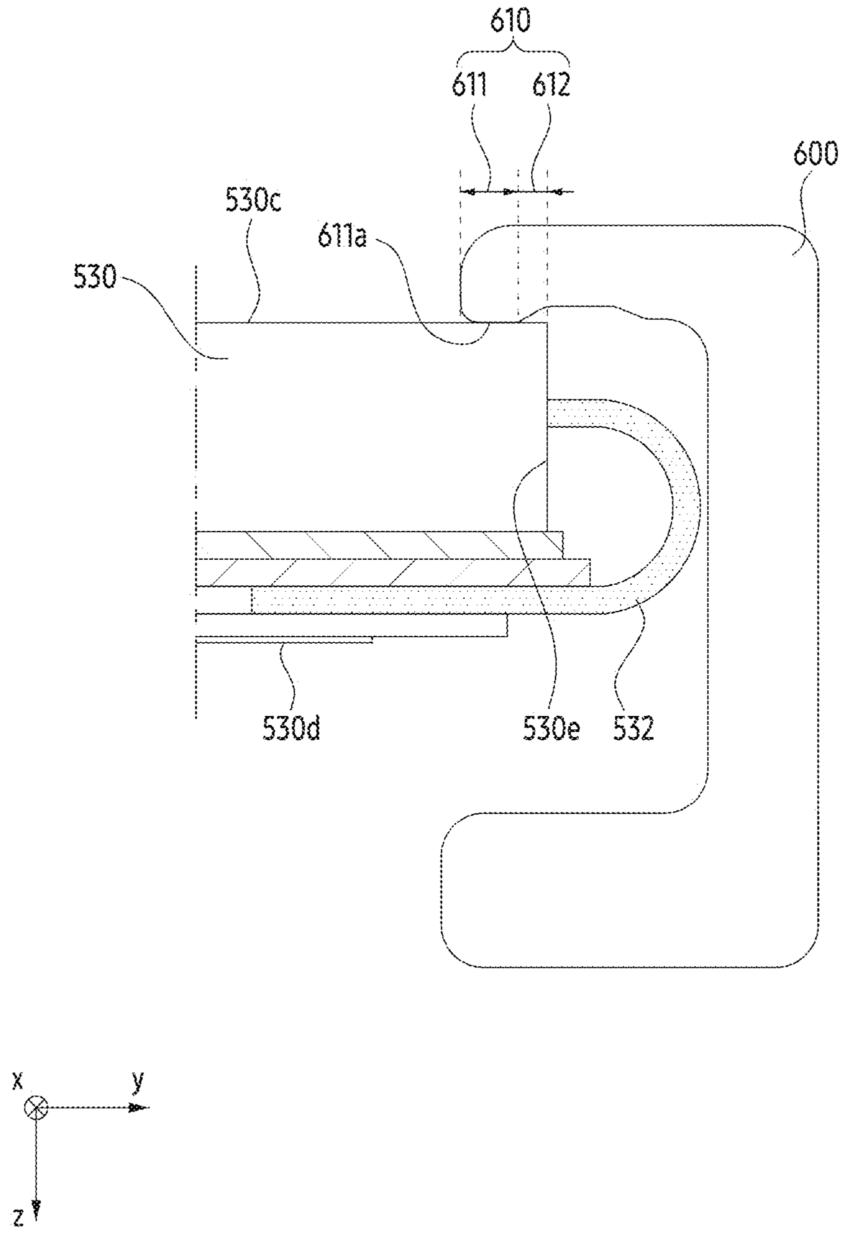
FIG. 6B is a cross-sectional view illustrating an example in which a display and a support of an electronic device according to an embodiment is cut along C-C' of FIG. 6A.

FIG. 6A is a perspective view of a display and a support of an electronic device according to an embodiment, and FIG. 6B is a cross-sectional view illustrating an example in which a display and a support of an electronic device according to an embodiment is cut along C-C' of FIG. 6A.

Referring to FIGS. 6A and 6B, according to an embodiment, the support 600 includes a plurality of supporting protrusions 610 that are at least partially in contact with one surface 530*c* of the display 530. For example, a plurality of supporting protrusions 610 may be in contact with an inactive region of the display 530. According to an embodiment, a plurality of supporting protrusions 610 is spaced apart from each other. For example, the plurality of supporting protrusions 610 may be spaced apart from each other along a third direction (+x direction or −x direction) vertical to the first direction (e.g., +y direction). In the space between the plurality of supporting protrusions 610, the support 600 may be spaced apart from the display 530. For example, the support 600 may include a plurality of supporting grooves 650 disposed between a plurality of supporting protrusions 610.

For example, as the second housing (e.g., the second housing 520 in FIGS. 5A and 5B) moves, friction may occur between the display 530 and the support 600. As the contact area between the support 600 and the display 530 increases, the friction between the support 600 and the display 530 increases, so the possibility of damage to the display 530 may increase. The electronic device (e.g., the electronic device 500 of FIGS. 5A and 5B) according to an embodiment may provide a structure for securing a space in which the support 600 and the display 530 are spaced apart from each other by a plurality of supporting protrusions 610 spaced apart from each other. The electronic device 500 according to an embodiment may provide a structure that reduces the possibility of damage to the display 530 because the contact area between the support 600 and the display 530 is minimized through a space where the support 600 and the display 530 are spaced apart.

According to an embodiment, each of a plurality of supporting protrusions 610 may include a first portion 611 and a second portion 612. The first portion 611 may be in contact with one surface 530*c* of the display 530. According to an embodiment, the first portion 611 may include a contact surface 611*a* in contact with one surface 530*c* of the display 530. For example, the contact surface 611*a* is in contact with one surface 530*c* of the display 530, and may extend in a third direction (+x direction) vertical to the first direction (e.g., +y direction), parallel to one surface 530*c* of the display 530. For another example, the contact surface 611*a* may be in contact with one surface 530*c* of the display 530 and may extend parallel to one surface 530*c* of the display 530 in a first direction (e.g., +y direction). As the contact surface 611*a* extends in the first direction and the third direction in a state in contact with the one surface 530*c* of the display 530, the contact surface 611*a* may form a surface contact with the one surface 530*c* of the display 530.

The second portion 612 may be connected to the first portion 611. According to an embodiment, the side surface 530*e* of the display 530 may be closer to the second portion 612 among the first portion 611 and the second portion 612. The side surface 530*e* of the display 530 may be vertical to one surface 530*c* of the display 530 and may face the first direction. According to an embodiment, the second portion 612 may be spaced apart from one surface 530*c* of the display 530. According to an embodiment, the second portion 612 may have a slope with respect to one surface 530*c* of the display 530. The second portion 612 may be inclined with respect to one surface 530*c* of the display 530. For example, the second portion 612 may extend from a point connected to the first portion 611 in a direction inclined with respect to one surface 530*c* of the display 530. As the second portion 612 is inclined with respect to one surface 530*c* of the display 530, the distance between the second portion 612 and the one surface 530*c* of the display 530 may increase along the first direction (e.g., +y direction). For another example, the slope of each point of the second portion 612 with respect to one surface 530*c* of the display 530 may be changed. As the slope of each point of the second portion 612 with respect to one surface 530*c* of the display 530 is changed, the second portion 612 may be bent with respect to one surface 530*c* of the display 530. According to an embodiment, the electronic device 500 may provide a structure that reduces a contact area between the support 600 and the display 530 by each of a plurality of supporting protrusions 610 of the support 600 including a second portion 612 spaced apart from the display 530. By reducing the contact area between the support 600 and the display 530, the electronic device 500 according to an embodiment may provide a structure that reduces the possibility of damage to the display 530.

As described above, according to an embodiment, the electronic device 500 may provide a structure for preventing the display 530 from being separated from the second housing 520 by the support 600 supporting the display 530. The electronic device 500 according to an embodiment may provide a structure for reducing damage to the display 530 because a plurality of supporting protrusions 610 preventing separation of the display 530 are spaced apart from each other.

Figure 7:
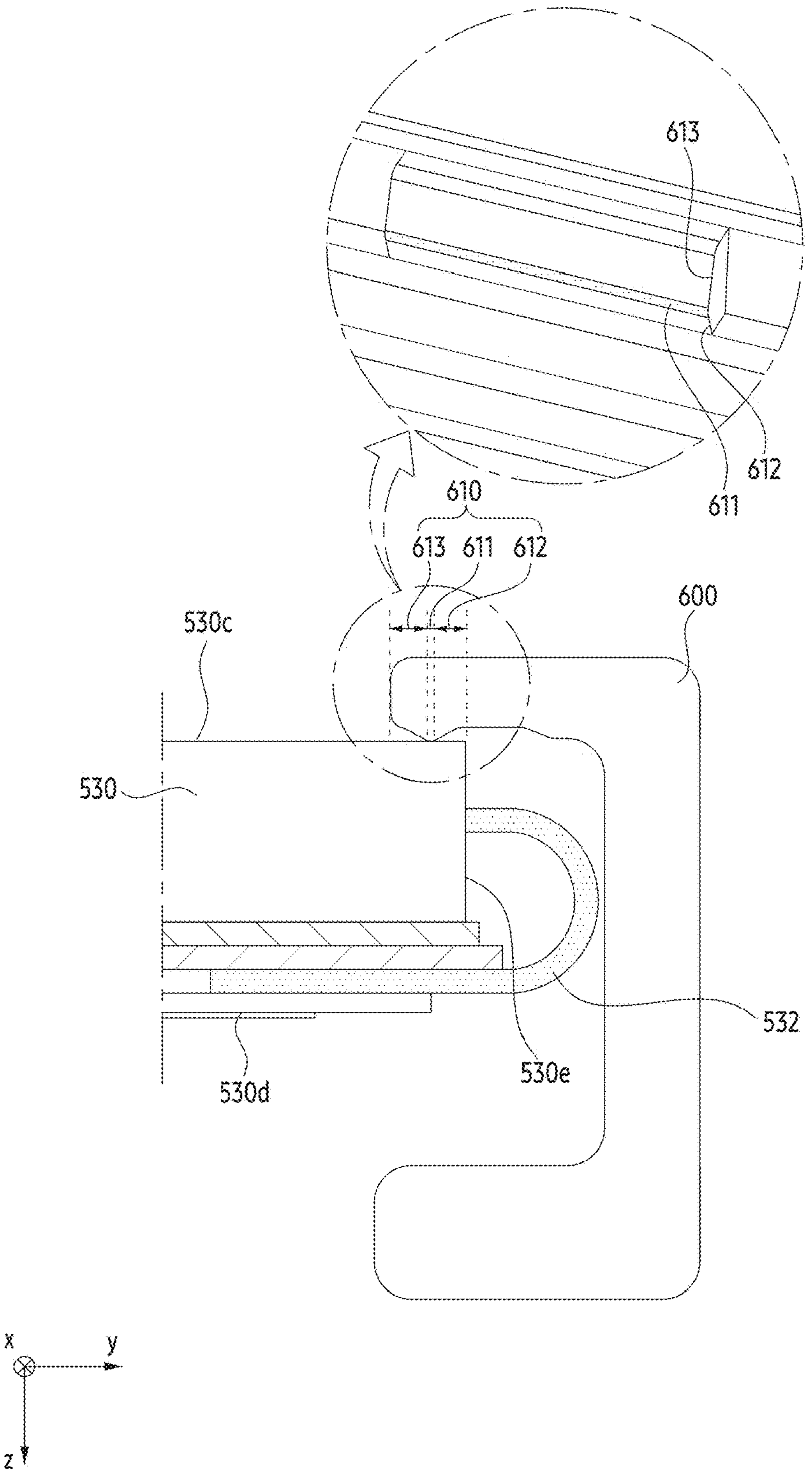
FIG. 7 is a cross-sectional view illustrating another example of cutting a display and a support of an electronic device according to an embodiment.

FIG. 7 is a cross-sectional view illustrating another example of cutting a display and a support of an electronic device according to an embodiment.

Referring to FIG. 7, each of a plurality of supporting protrusions 610 of the support 600 according to an embodiment may further include a third portion 613. The third portion 613 may be spaced apart from one surface 530*c* of the display 530. The third portion 613 may be connected to the first portion 611. According to an embodiment, the third portion 613 may be inclined with respect to one surface 530*c* of the display 530. For example, the third portion 613 may extend toward a point in contact with the first portion 611 in a direction close to one surface 530*c* of the display 530. As the third portion 613 is inclined with respect to one surface 530*c* of the display 530, the distance between the third portion 613 and the one surface 530*c* of the display 530 may decrease toward a point in contact with the first portion 611.

According to an embodiment, the second portion 612 and the third portion 613 may be bent with respect to the first portion 611. For example, the first portion 611 may include a contact surface 611*a* extending along the first direction (e.g., +y direction) parallel to one surface 530*c* of the display 530, and contacting one surface 530*c* of the display 530. At least one of the second portion 612 and the third portion 613 may be bent with respect to the first portion 611 to have a curvature. For example, at least one of the second portion 612 and the third portion 613 may have a curvature to be convex with respect to one surface 530*c* of the display 530. For another example, at least one of the second portion 612 and the third portion 613 may have a curvature to be concave to one surface 530*c* of the display 530.

According to an embodiment, the first portion 611 may be disposed between the second portion 612 and the third portion 613. For example, the side surface 530*e* of the display 530 may be closer to the first portion 611 among the first portion 611 and the third part 613. As the first portion 611 is disposed between the second portion 612 and the third portion 613, the distance space apart from the side surface 530*e* of the display 530 along the second direction (e.g., the −y direction) may increase toward the second portion 612, the first portion 611, and the third portion 613.

According to an embodiment, as the first portion 611 is disposed between the second portion 612 and the third portion 613, the first portion 611 in contact with the one surface 530*c* of the display 530 may be close to the side surface 530*e* of the display 530. If the first portion 611 approaches the side surface 530*e* of the display 530, the first portion 611 may not be visible when the display 530 is viewed from above (e.g., −z direction). For example, as the second housing (e.g., second housing 520 of FIGS. 5A and 5B) moves, one surface 530*c* of the display 530 may be damaged by friction between the display 530 and the support 600. If one surface 530*c* of the display 530 is damaged, the scratch may occur on one surface 530*c* of the display 530 adjacent to the first portion 611. According to an embodiment, the electronic device (e.g., electronic device 500 of FIGS. 5A and 5B) may form a point where the support 600 and the display 530 contact each other close to the side surface 530*e* of the display 530 through the third portion 613. As the point at which the support 600 and the display 530 are in contact is formed close to the side surface 530*e* of the display 530, the scratches that may be generated by the support 600 may be covered by the support 600 and may not be visible from the outside.

As described above, according to an embodiment, the electronic device 500 may smoothly provide visual information to the user by a third portion 613 capable of forming a contact point between the display 530 and the support 600 close to the side surface 530*e* of the display 530.

Figure 8:
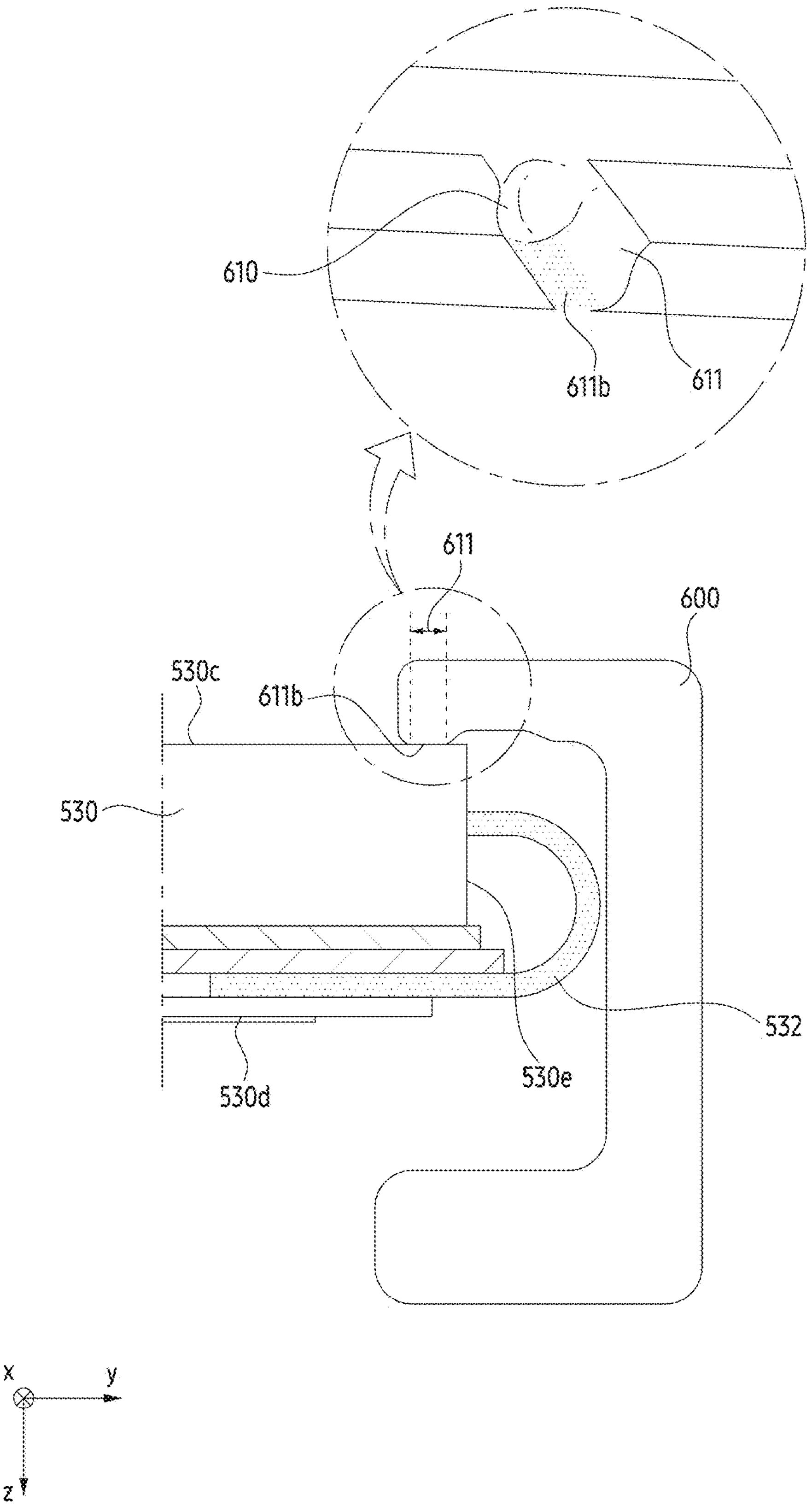
FIG. 8 is a cross-sectional view illustrating another example of cutting a display and a support of an electronic device according to an embodiment.

FIG. 8 is a cross-sectional view illustrating another example of cutting a display and a support of an electronic device according to an embodiment.

Referring to FIG. 8, each of a plurality of supporting protrusions 610 of the support 600 according to an embodiment may have a curved shape. Each of a plurality of supporting protrusions 610 may have a cylinder shape in which at least a part extends in the first direction. For example, a cross section of each of the plurality of supporting protrusions 610 obtained by cutting the plurality of supporting protrusions 610 along a third direction (+x direction) vertical to the first direction may be circular.

According to an embodiment, the first portion 611 of each of the plurality of supporting protrusions 610 may have a curvature and may include a first curved surface 611*b* extending in the first direction and contacting one surface 530*c* of the display 530. For example, the first curved surface 611*b* may be convex toward one surface 530*c* of the display 530. Since the shape in which the curved surface and the plane are in contact with each other is substantially close to a straight line, the first curved surface 611*b* may substantially form a line contact with the one surface 530*c* of the display 530.

As described above, the electronic device 500 according to an embodiment may provide a structure that reduces the contact area between the display 530 and the support 600 by the first portion 611 of the supporting protrusion 610 that substantially forms a line contact with one surface 530*c* of the display 530. Since the smaller the contact area between the display 530 and the support 600, the less friction between the display 530 and the support 600, the electronic device 500 according to an embodiment may provide a structure that reduces the possibility of damage to the display 530.

Figure 9:
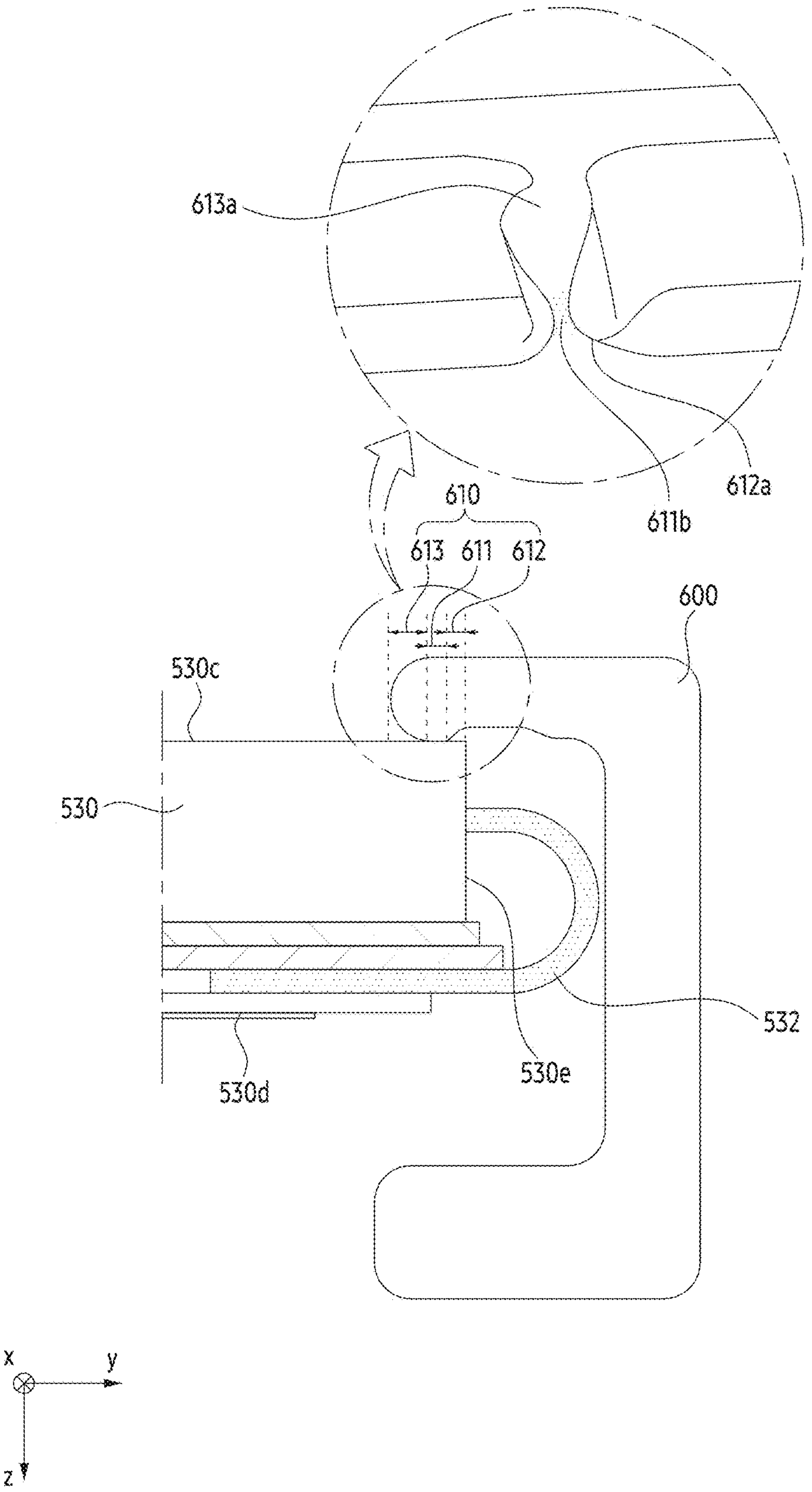
FIG. 9 is a cross-sectional view illustrating another example of cutting a display and a support of an electronic device according to an embodiment.

FIG. 9 is a cross-sectional view illustrating another example of cutting a display and a support of an electronic device according to an embodiment.

Referring to FIG. 9, according to an embodiment, each of a plurality of supporting protrusions 610 of the support 600 may include a first portion 611, a second portion 612, and a third portion 613. The first portion 611 may be in contact with one surface 530*c* of the display 530. For example, the first portion 611 may include a first curved surface 611*b* that is in contact with one surface 530*c* of the display 530 and extends in the first direction (+y direction). Since the shape in which the curved surface and the plane are in contact is substantially close to a straight line, the first curved surface 611*b* may form a substantially line contact with one surface 530*c* of the display 530.

According to an embodiment, the second portion 612 may be spaced apart from one surface 530*c* of the display 530. The second portion 612 may be bent with respect to one surface 530*c* of the display 530. For example, the second portion 612 may include a second curved surface 612*a* bent with respect to one surface 530*c* of the display 530 and extending toward the first curved surface 611*b*. The second curved surface 612*a* may be spaced apart from one surface 530*c* of the display 530 except for a point in contact with the first curved surface 611*b*.

According to an embodiment, the third portion 613 may be spaced apart from one surface 530*c* of the display 530. The third portion 613 may be bent with respect to one surface 530*c* of the display 530. For example, the third portion 613 may include a third curved surface 613*a* bent with respect to one surface 530*c* of the display 530 and extending toward the first curved surface 611*b*. The third curved surface 613*a* may be spaced apart from one surface 530*c* of the display 530 except for a point in contact with the first curved surface 611*b*.

As described above, the electronic device 500 according to an embodiment may provide a structure that reduces the contact area between the display 530 and the support 600 by the first portion 611 of the supporting protrusion 610 that substantially forms a line contact with one surface 530*c* of the display 530. As the contact area between the display 530 and the support 600 is smaller, friction between the display 530 and the support 600 may be reduced. The electronic device 500 according to an embodiment may provide a structure that reduces a contact area between the display 530 and the support 600 by the second portion 612 and the third portion 613 spaced apart from one surface 530*c* of the display 530.

Figure 10:
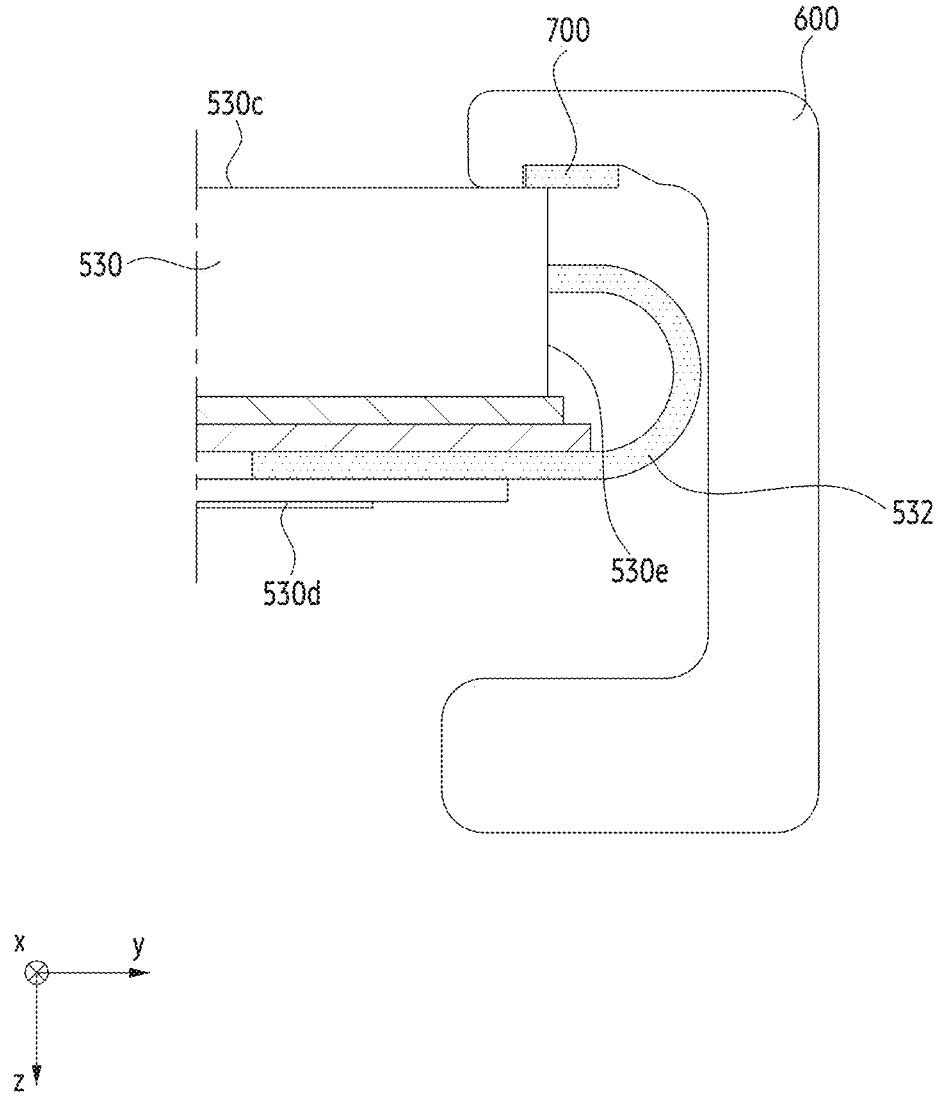
FIG. 10 is a cross-sectional view illustrating another example of cutting a display and a support of an electronic device according to an embodiment.

FIG. 10 is a cross-sectional view illustrating another example of cutting a display and a support of an electronic device according to an embodiment.

Referring to FIG. 10, according to an embodiment, an electronic device (e.g., electronic device 500 of FIGS. 5A and 5B) may include a sealing member 700 that protects the display 530. The sealing member 700 according to this embodiment may be combined with the various other embodiments according to the disclosure. The sealing member 700 may prevent a foreign object from being entered through the space between the support 600 and the one surface 530*c* of the display 530. According to an embodiment, the sealing member 700 may be interposed between the support 600 and the one surface 530*c* of the display 530. For example, the sealing member 700 may extend in a third direction (e.g., +x direction) in a state in contact with the support 600.

According to an embodiment, the sealing member 700 may be spaced apart from one surface 530*c* of the display 530. For example, the separation distance between the sealing member 700 and the one surface 530*c* of the display 530 may be 0.04 mm to 0.06 mm, but is not limited thereto.

According to an embodiment, the sealing member 700 may include an absorption member or a sealing member for absorbing or waterproofing water entered from the outside of the electronic device 500. For example, the sealing member 700 may include at least one of sponge, micro fiber, rubber, silicone, and polyurethane, but is not limited thereto.

As described above, the electronic device 500 according to an embodiment may provide a structure for protecting the display 530 by the sealing member 700 preventing foreign object from being entered through the space between the support 600 and the one surface 530*c* of the display 530.

Figure 11A:
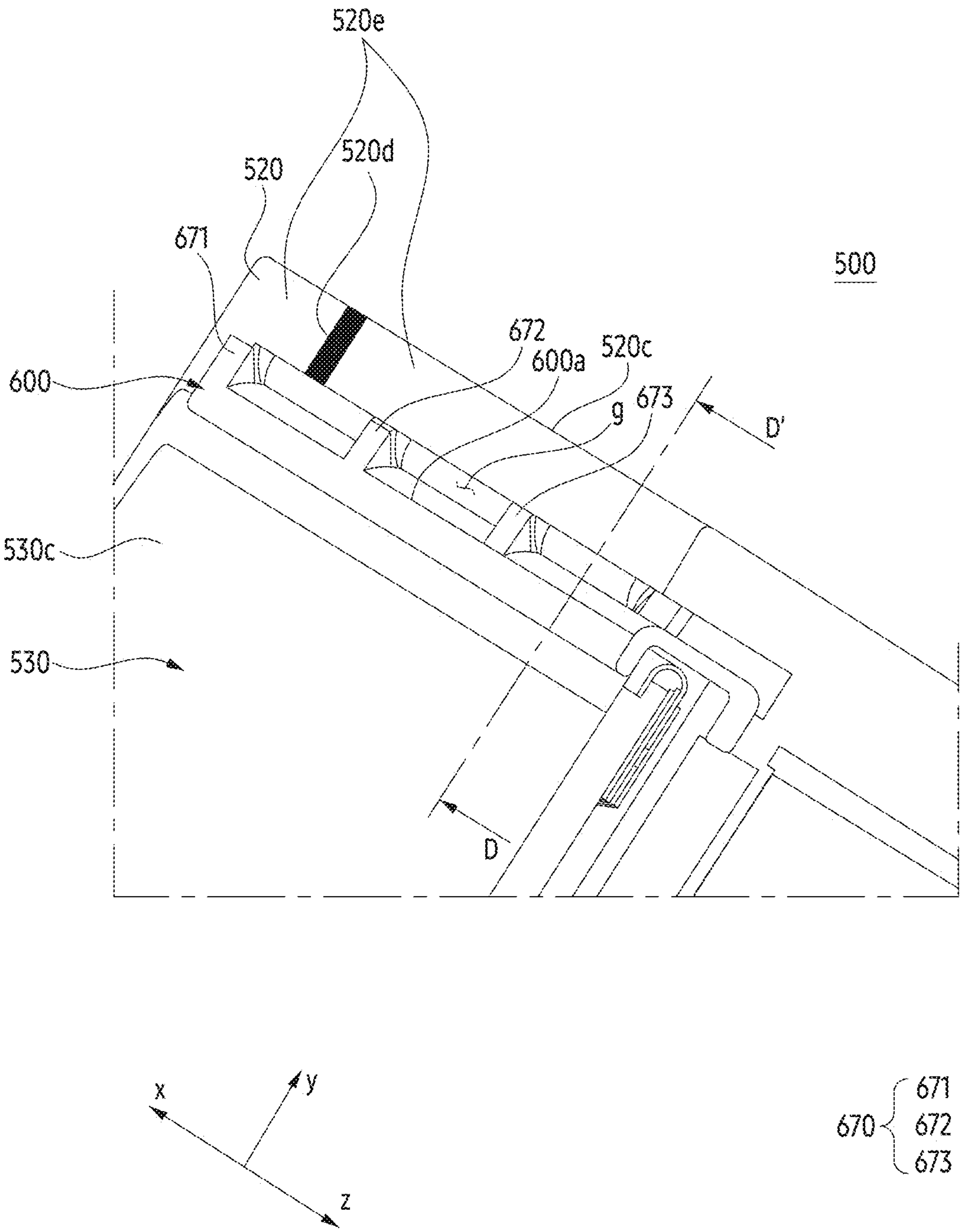
FIG. 11A is a perspective view illustrating an electronic device according to an embodiment.
Figure 11B:
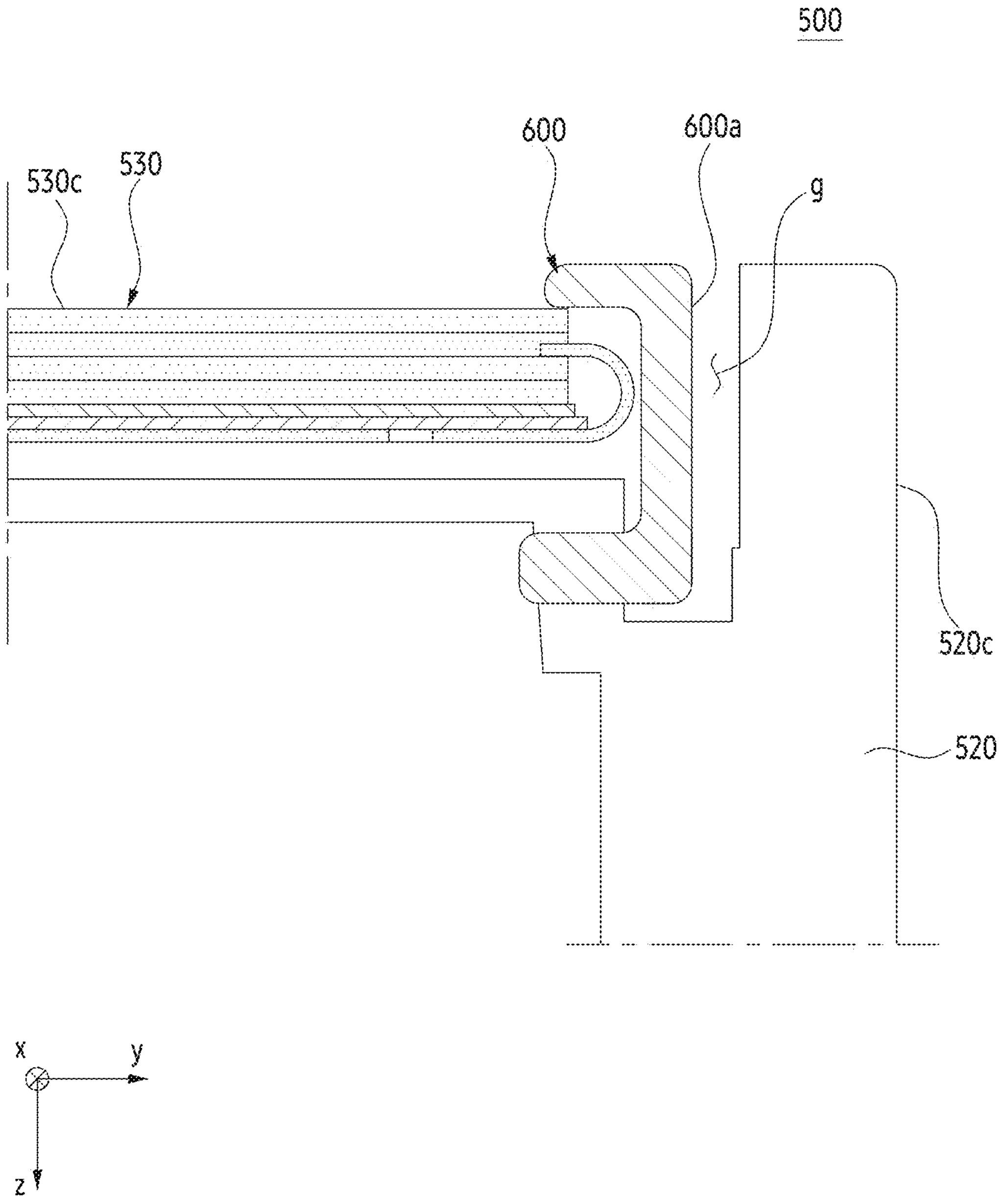
FIG. 11B is a cross-sectional view illustrating an example in which a display and a support of an electronic device according to an embodiment is cut along D-D' of FIG. 11A.

FIG. 11A is a perspective view illustrating an electronic device according to an embodiment, and FIG. 11B is a cross-sectional view illustrating an example in which a display and a support of an electronic device according to an embodiment is cut along D-D' of FIG. 11A. The antenna radiator according to this embodiment may be combined with the various other embodiments according to the disclosure.

Referring to FIGS. 11A and 11B, the second housing 520 may include a conductive portion 520*e* and a non-conductive portion 520*d*. According to an embodiment, the conductive portion 520*e* forming a part of the side surface 520*c* of the second housing 520 may include a conductive material. The non-conductive portion 520*d* forming another part of the side surface 520*c* of the second housing 520 may include a non-conductive material. According to an embodiment, the conductive portion 520*e* may be divided by the non-conductive portion 520*d*. Each of the divided conductive portions 520*e* may operate as an antenna radiator. The antenna radiator may be configured to be connected to a wireless communication circuit to transmit a signal to the outside of the electronic device 500 or to receive it from the outside. According to an embodiment, the conductive portion 520*e* of the second housing 520 operating as an antenna may be spaced apart from the display 530.

According to an embodiment, the support 600 may include an extending protrusion 670. The extending protrusion 670 may secure a separation distance between the display 530 and the conductive portion 520*e* operating as an antenna radiator. For example, the extending protrusion 670 may extend from one surface 600*a* of the support 600 facing the first direction (e.g., +y direction) to the second housing 520 along the first direction. As the extending protrusion 670 is formed, the distance between the display 530 and the conductive portion 520*e* operating as an antenna may increase compared to the case without the extending protrusion 670. According to an embodiment, the extending protrusion 670 may include a non-conductive material. As the extending protrusion 670 includes a non-conductive material, the extending protrusion 670 may be electrically disconnected from the conductive portion 520*e*.

According to an embodiment, the extending protrusion 670 may form an air gap g between the display 530 to secure antenna performance and the conductive portion 520*e* of the second housing 520 operating as an antenna radiator. The extending protrusion 670 may include a plurality of extending protrusions 671, 672, 673 spaced apart from each other in a third direction vertical to the first direction (e.g., the +x direction). The air gap g may be disposed between a plurality of extending protrusions 670. As the air gap g is formed, effective loss of the antenna radiator may be reduced.

According to an embodiment, the distance between the plurality of extending protrusions 671, 672, 673 may not be constant. For example, the distance between the first extending protrusion 671 and the second extending protrusion 672 among the plurality of extending protrusions 670 may be different from a distance between the second extending protrusion 672 and the third extending protrusion 673 among the plurality of extending protrusions 670. However, it is not limited thereto, and the distances between the plurality of extending protrusions 670 may be the same.

According to an embodiment, audio output from the audio module of the electronic device 500 (e.g., audio module 170 of FIG. 1) may be transmitted to the outside of the electronic device 500 through between the plurality of extending protrusions 670. For example, audio output from the audio module 170 may pass between the second extending protrusion 672 and the third extending protrusion 673 to be transmitted to the outside of the electronic device 500. In case that the second extending protrusion 672 and the third extending protrusion 673 form an audio path that emits audio to the outside of the electronic device 500, a distance between the second extending protrusion 672 and the third extending protrusion 673 may be longer than a distance between the other plurality of extending protrusions 670. According to an embodiment, the second extending protrusion 672 and the third extending protrusion 673 may be surrounded by the plurality of other extending protrusions 670. For example, the second extending protrusion 672 and the third extending protrusion 673 forming the audio path may be disposed at the center of the plurality of extending protrusions 670.

As described above, the electronic device 500 may provide a structure capable of securing the performance of the antenna. The support 600 of the electronic device 500 according to an embodiment may reduce the influence of the display 530 of the second housing 520 operating as an antenna by the extending protrusion 670 for forming the air gap g between the display 530 and the conductive portion 520*e* operating as an antenna radiator.

Figure 12A:
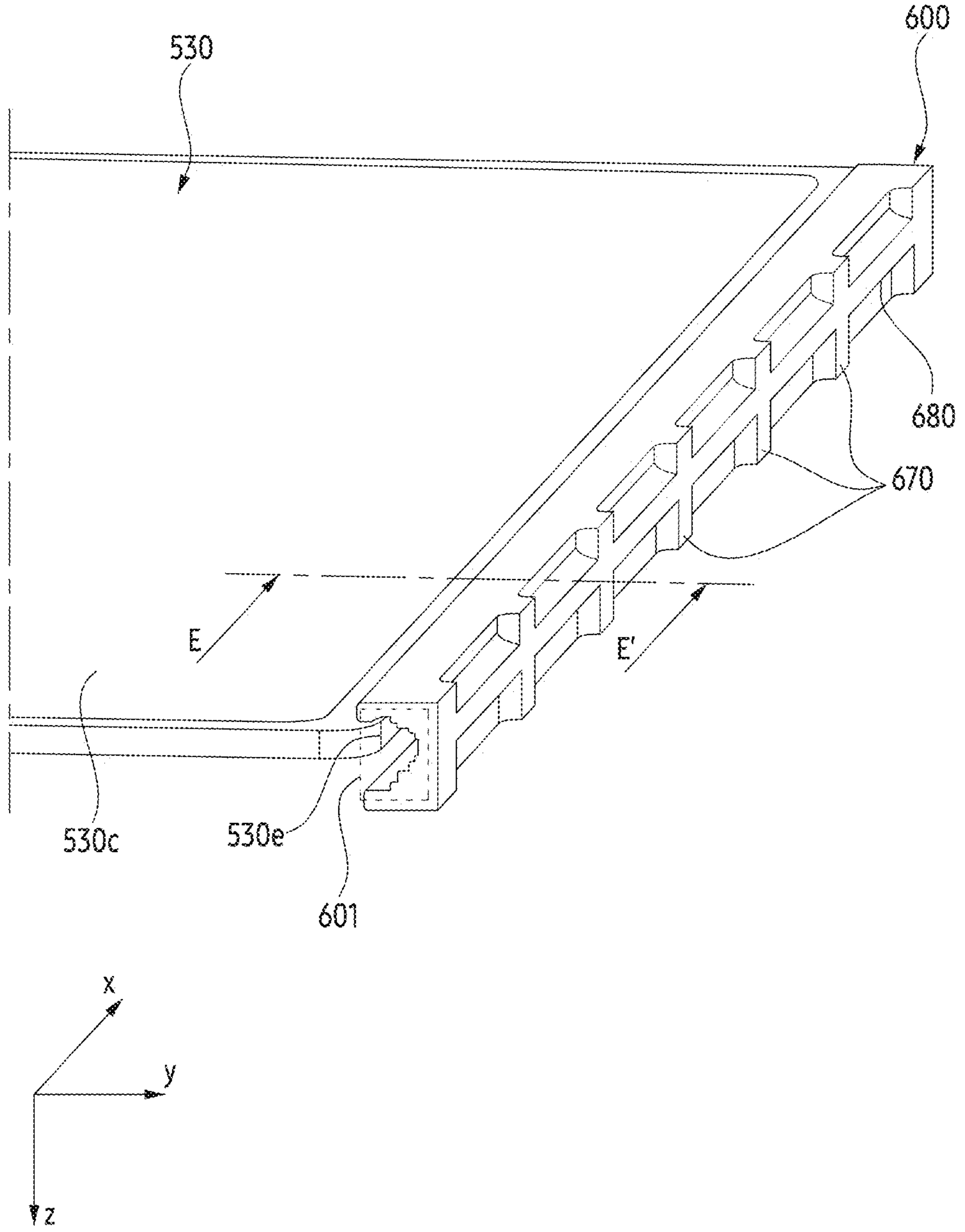
FIG. 12A is a perspective view of a display and a support of an electronic device according to an embodiment.
Figure 12B:
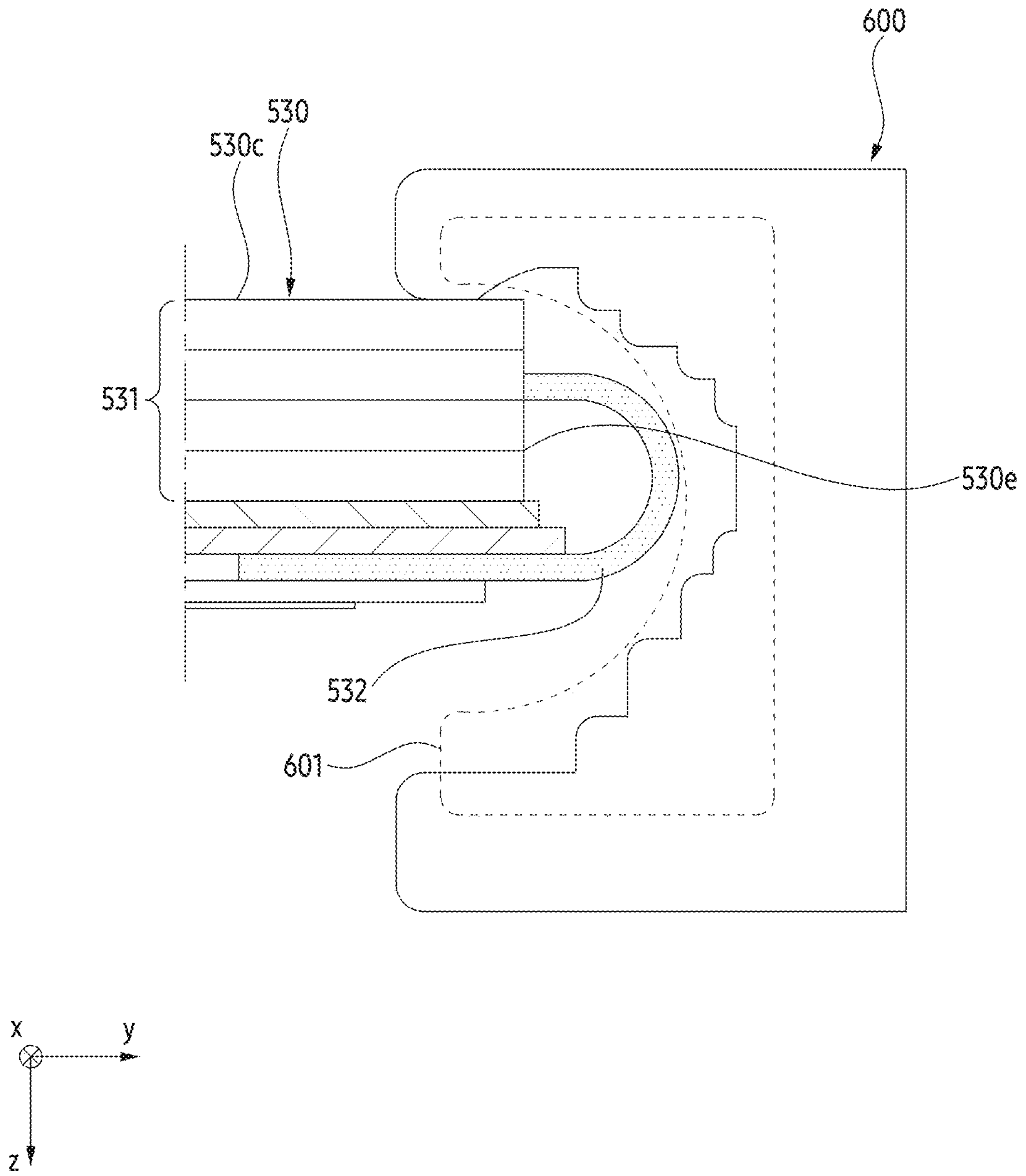
FIG. 12B is a cross-sectional view illustrating an example in which a display and a support of an electronic device according to an embodiment is cut along E-E' of FIG. 12A.

FIG. 12A is a perspective view of a display and a support of an electronic device according to an embodiment, and FIG. 12B is a cross-sectional view illustrating an example in which a display and a support of an electronic device according to an embodiment is cut along E-E' of FIG. 12A. The supporting structure according to this embodiment may be combined with the various other embodiments according to the disclosure.

Referring to FIGS. 12A and 12B, according to an embodiment, the first region 601 of the support 600 surrounding the display 530 may have a shape corresponding to the shape of the display 530. For example, the first region 601 of the support 600 may have a shape corresponding to the side surface 530*e* of the display 530.

According to an embodiment, the first region 601 of the support 600 may include a plurality of irregularities. For example, in the side surface 530*e* of the display 530, a length in which some of the plurality of layers included in the display panel 531 protrude may be different from a length in which other parts of the plurality of layers protrude. As the protruding length of each of the plurality of layers is different, the side surface 530*e* of the display 530 may have a shape including prominence and depression. The first region 601 of the support 600 may have a shape corresponding to a plurality of prominences and depressions to accommodate a plurality of prominences and depressions of the side surface 530*e* of the display 530.

According to an embodiment, the first region 601 of the support 600 may have a shape corresponding to the board 532 of the display 530. The board 532 may extend from the side surface 530*e* of the display 530 toward the other surface 530*d* of the display 530. For example, the board 532 may protrude from the side surface 530*e* of the display 530 and may have a bent shape. The first region 601 of the support may have a shape corresponding to a bent part of the board 532 to accommodate a part of the bent shape of the board 532.

For example, in case that the first region 601 of the support 600 does not have a shape corresponding to the shape of the display 530, the first region 601 of the support 600 needs to form a relatively large space to accommodate the display 530. If the first region 601 forms a relatively large space, the width (e.g., a length extending in the first direction) of the support 600 may increase so that the support 600 has rigidity. If the width of the support 600 increases, the size of the electronic device (e.g., the electronic device 500 of FIGS. 5A and 5B) increases, so that it may be inconvenient for a user to carry the electronic device 500. In the electronic device 500 according to an embodiment, the support 600 may have a width reduced by the first region 601 of the support 600 having a shape corresponding to the shape of the display 530. The electronic device 500 according to an embodiment may be miniaturized by a support 600 having a reduced width.

According to an embodiment, the support 600 may include a plurality of extending protrusions 670. For example, the plurality of extending protrusions 670 may extend along a first direction (e.g., +y direction) from a surface 600*a* of the support 600 facing the first direction. For another example, a plurality of extending protrusions 670 may be spaced apart from each other in a third direction (e.g., +x direction) vertical to the first direction.

According to an embodiment, the support 600 may include a reinforcing protrusion 680. The reinforcing protrusion 680 may reinforce the rigidity of the support 600. According to an embodiment, the reinforcing protrusion 680 may extend along a third direction vertical to the first direction. For example, the reinforcing protrusion 680 may cross a plurality of extending protrusions 670 on one surface 600*a* of the support 600. The reinforcing protrusion 680 may connect a plurality of extending protrusions 670 by crossing a plurality of extending protrusions 670. According to an embodiment, the reinforcing protrusion 680 may form substantially the same plane with the plurality of extending protrusions 670 by crossing the plurality of extending protrusions 670.

For example, as the first region 601 of the support 600 has a shape corresponding to the shape of the display 530, the support 600 may have a reduced width. If the width of the support 600 decreases, the rigidity of the support 600 decreases, so that the support 600 may be vulnerable to damage. The reinforcing protrusion 680 may extend in the width direction (e.g., third direction) of the support 600 to reinforce the rigidity of the support 600.

As described above, the electronic device 500 according to an embodiment may provide a structure in which the width (e.g., length in the first direction) of the support 600 is reduced by the first region 601 of the support 600 having a shape corresponding to the shape of the display 530. The electronic device 500 according to an embodiment may provide a structure for reinforcing the rigidity of the support 600 by a reinforcing protrusion 680 extending in the width direction (e.g., third direction) of the support 600.

Figure 13A:
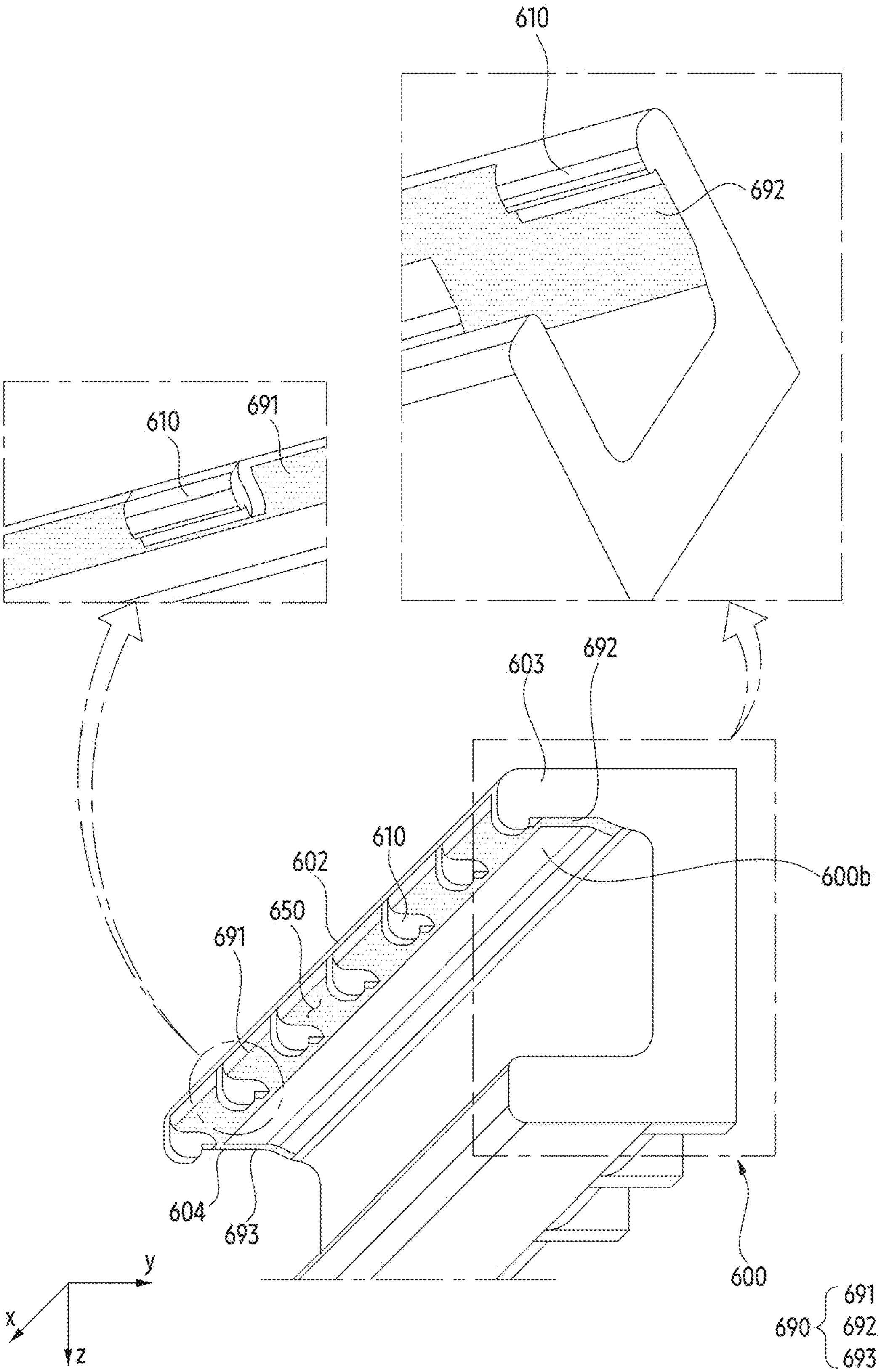
FIG. 13A is a perspective view of a support according to an embodiment.
Figure 13B:
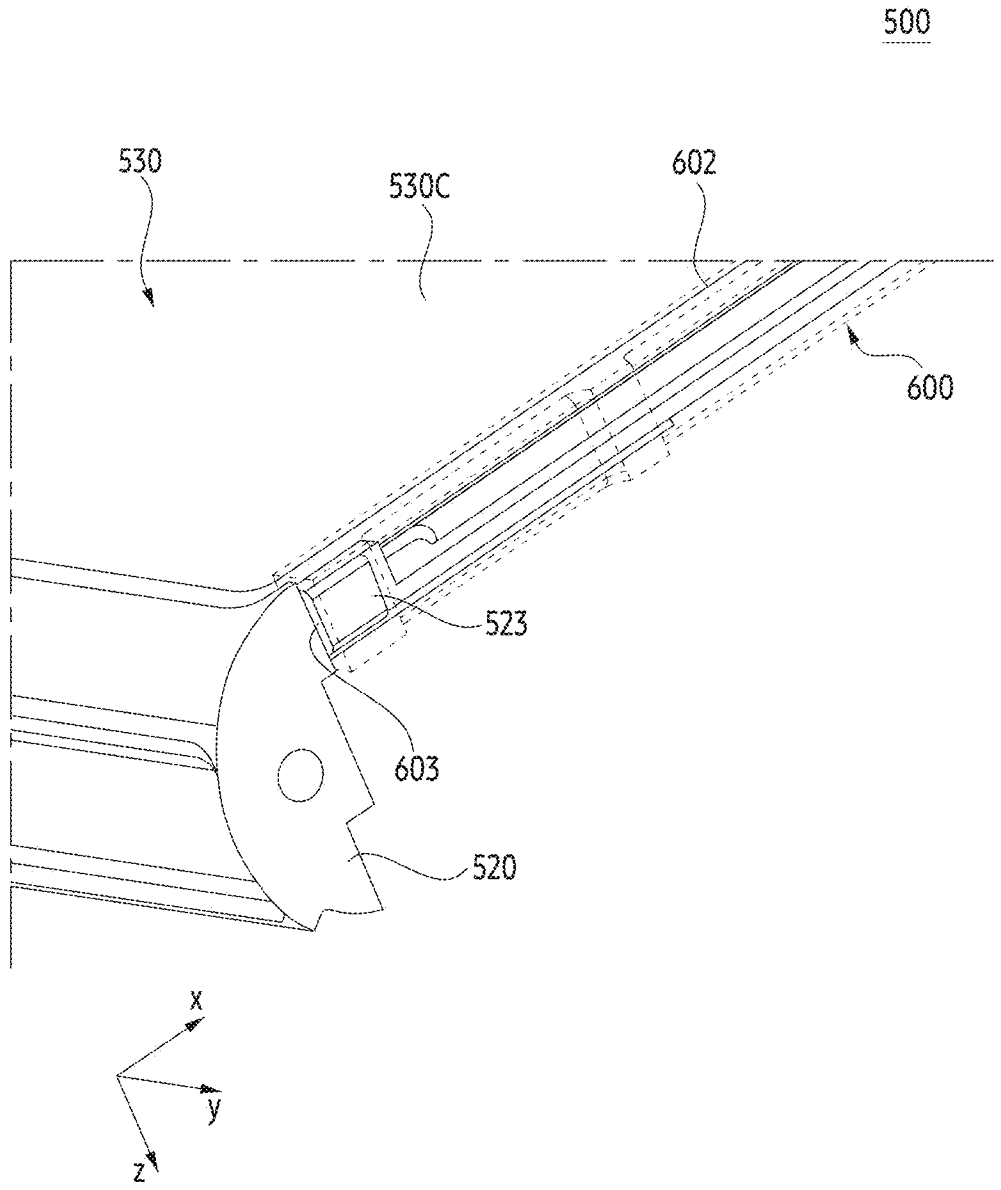
FIG. 13B is a perspective view of an electronic device in a state in which a support is coupled according to an embodiment.

FIG. 13A is a perspective view of a support according to an embodiment, and FIG. 13B is a perspective view of an electronic device in a state in which a support is coupled according to an embodiment.

Referring to FIGS. 13A and 13B, the support 600 of the electronic device 500 according to an embodiment may include a conductive layer 690. The support 600 according to this embodiment may be combined with the various other embodiments according to the disclosure. The conductive layer 690 may reduce inflow of static electricity into the display driving circuit of the display 530. According to an embodiment, the conductive layer 690 may be disposed on the inner surface 600*b* of the support 600 facing one surface 530*c* of the display 530. At least a part of the conductive layer 690 may be in contact with the second housing 520. As the conductive layer 690 is in contact with the second housing 520 and the support 600, the conductive layer 690 induces static electricity applied to one surface 530*c* of the display 530 to move to the second housing 520, thereby reducing the transfer of static electricity to the display driving circuit. For example, the conductive layer 690 may be formed by depositing a layer including a conductive material on the inner surface 600*b* of the support 600. As another example, the conductive layer 690 may be formed by attaching an adhesive member (e.g., nano tape) including a conductive material to the inner surface 600*b* of the support 600. According to an embodiment, the conductive layer 690 may include a first conductive layer 691, a second conductive layer 692, and a third conductive layer 693.

According to an embodiment, the first conductive layer 691 may be spaced apart from a plurality of supporting protrusions 610 and may surround a part of the plurality of supporting protrusions 610. For example, the first conductive layer 691 may bypass each of the plurality of supporting protrusions 610 and may be disposed in each of the plurality of supporting grooves 650. According to an embodiment, the first conductive layer 691 may be disposed at the first periphery 602 of the support 600 on which a plurality of supporting protrusions 610 are disposed. For example, the first conductive layer 691 may extend along the first periphery 602 of the support 600 in a third direction vertical to the first direction (e.g., +y direction).

According to an embodiment, the second conductive layer 692 may be connected to the first conductive layer 691. For example, the second conductive layer 692 may be disposed at the second periphery 603 vertical to the first periphery 602 of the support 600 in which a plurality of supporting protrusions 610 are disposed. According to an embodiment, the second conductive layer 692 may be spaced apart from a plurality of supporting protrusions 610.

According to an embodiment, the third conductive layer 693 may be connected to the first conductive layer 691. For example, the third conductive layer 693 may be disposed at the third periphery 604 vertical to the first periphery 602 of the support 600 in which a plurality of supporting protrusions 610 are disposed. The third periphery 604 may face the second periphery 603 and be spaced apart from the second periphery 603 along a third direction. According to an embodiment, the second conductive layer 692 may be spaced apart from a plurality of supporting protrusions 610.

According to an embodiment, the second housing 520 may include a conductive region 523 in contact with at least a part of the conductive layer 690 of the support 600. The conductive region 523 may be electrically connected to the conductive layer 690. For example, the conductive region 523 may be made of a material including a conductive material, but is not limited thereto. According to an embodiment, the conductive region 523 may be disposed in a part of the second housing 520 facing the second periphery 603 of the support 600. In FIG. 13B, a conductive region 523 is illustrated as being disposed in a part of the second housing 520 facing the second periphery 603 of the support 600, but is not limited thereto. For example, the conductive region 523 may be disposed on the other part of the second housing 520 facing the third periphery 604 of the support 600. According to an embodiment, the conductive region 523 may be spaced apart from the display 530 to reduce the transmission of static electricity to the display driving circuit of the display 530. For example, the conductive region 523 may be spaced apart from the display 530 along a first direction (e.g., +y direction).

As described above, the electronic device 500 according to an embodiment may reduce damage to the display 530 through the conductive layer 690 of the support 600 that reduces the transmission of static electricity to the display driving circuit of the display 530.

Figure 14A:
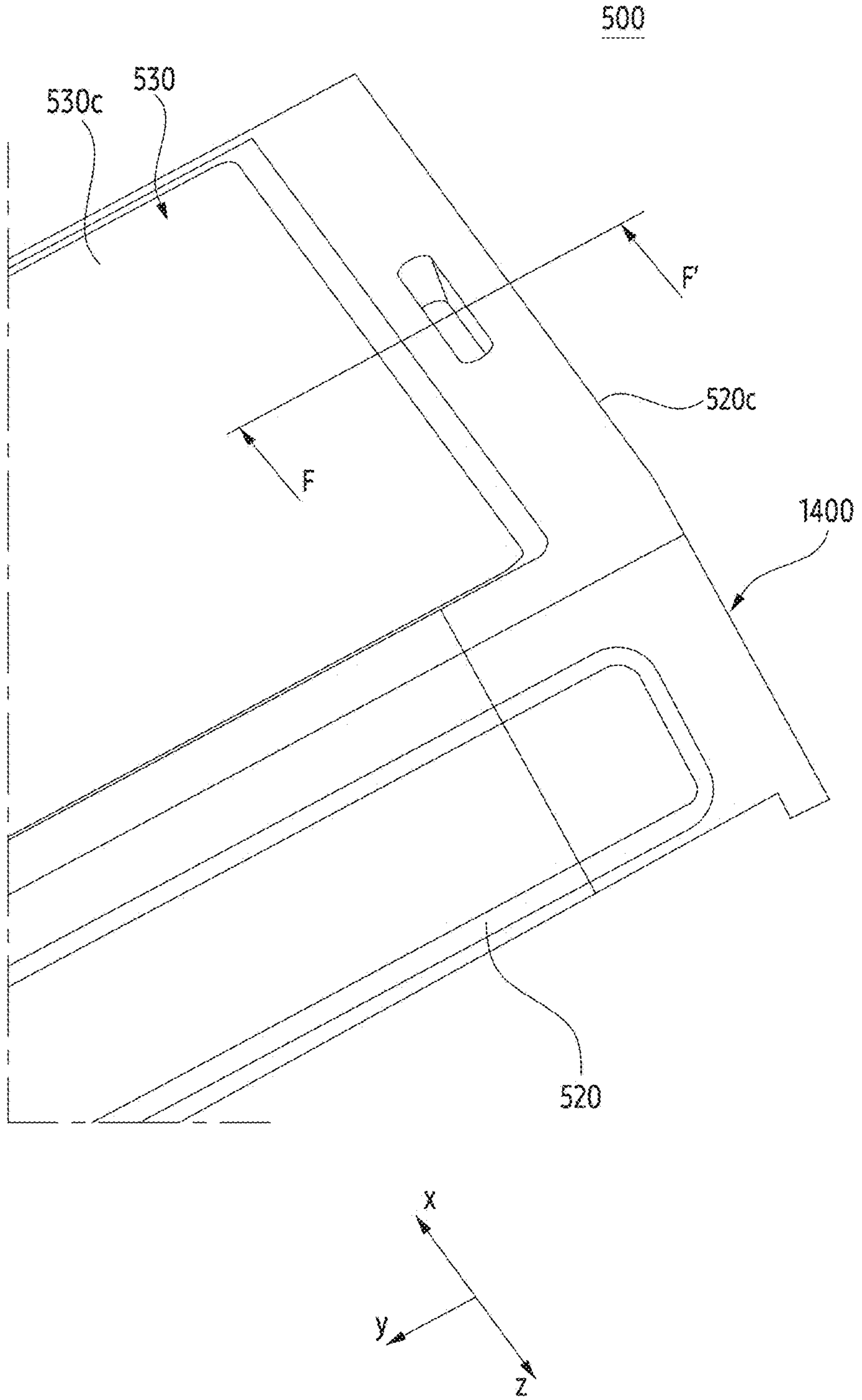
FIG. 14A is a perspective view illustrating an electronic device according to an embodiment.
Figure 14B:
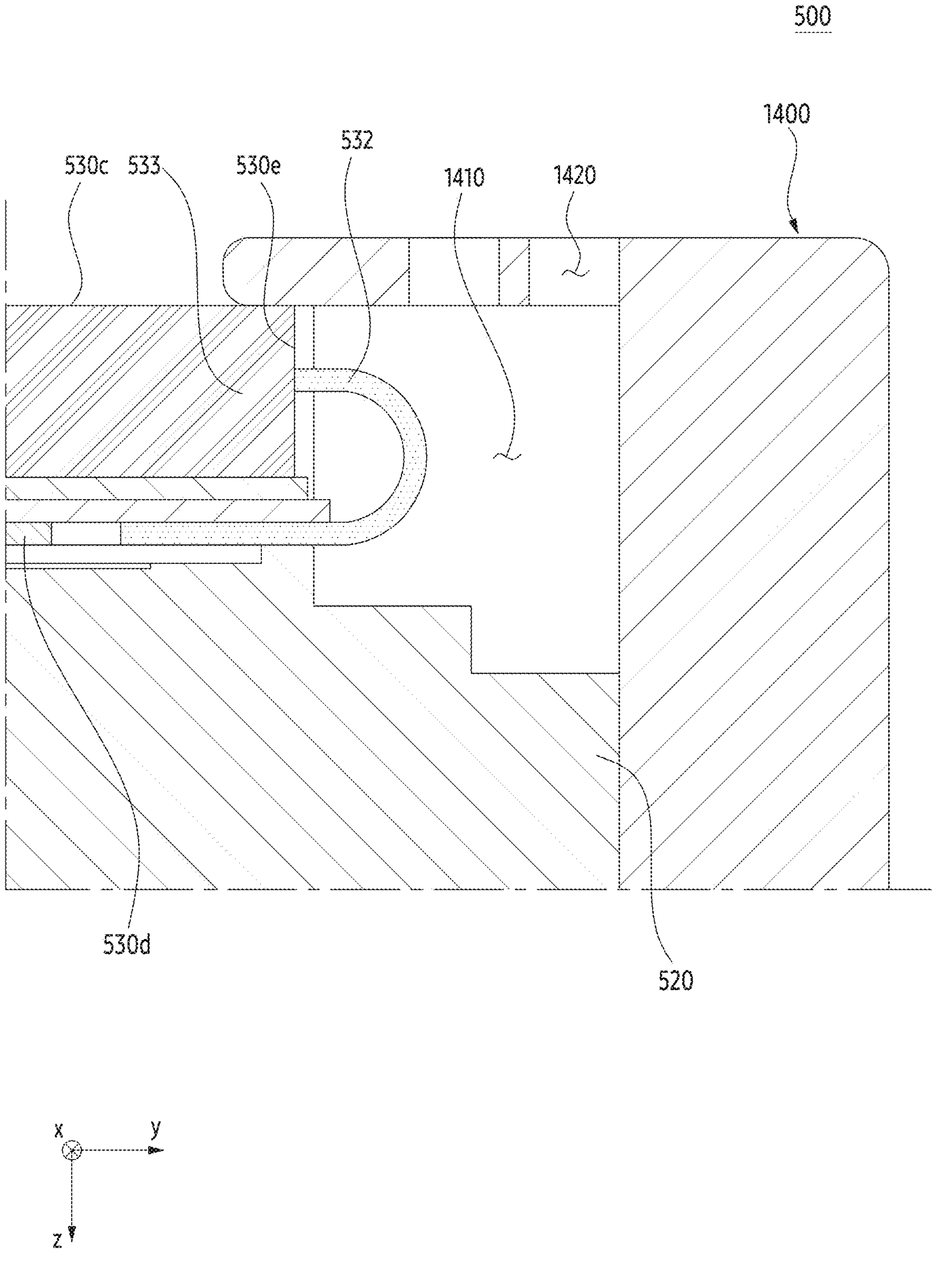
FIG. 14B is a cross-sectional view illustrating an example in which a display and a support of an electronic device according to an embodiment is cut along F-F' of FIG. 14A.

FIG. 14A is a perspective view illustrating an electronic device according to an embodiment, and FIG. 14B is a cross-sectional view illustrating an example in which a display and a support of an electronic device according to an embodiment is cut along F-F' of FIG. 14A.

Referring to FIGS. 14A and 14B, according to an embodiment, the electronic device 500 may further include a support 1400. Since the support 1400 of FIG. 14 may be a support 1400 of which the structure of the support 600 of FIGS. 5A and 5B has been changed, repeated descriptions will be omitted. The support according to this embodiment may be combined with the various other embodiments according to the disclosure.

According to an embodiment, the support 1400 may surround a part of the second housing 520 facing the first direction (e.g., +y direction). For example, the support 1400 may be coupled to a part of the second housing 520 facing the first direction (e.g., +y direction) to form a side surface 520*c* of the second housing 520. As the support 1400 surrounds a part of the second housing 520, the support 1400 may form an outer surface of the electronic device 500. According to an embodiment, the support 1400 may cover the periphery 533 of the display 530.

According to an embodiment, the support 1400 may support the display 530. For example, a part of the support 1400 may be in contact with one surface 530*c* of the display 530 to prevent the display 530 from being separated from the second housing 520.

According to an embodiment, the support 1400 may include an inner space 1410 and an audio hole 1420. The inner space 1410 may accommodate the board 532 of the display 530. For example, the inner space 1410 may extend in the first direction (+y direction) from the side surface 530*e* of the display 530. The board 532 is to be extended from the side surface 530*e* of the display 530 and then bent in the inner space 1410 of the support 1400 to extend toward the other surface 530*d* of the display 530.

According to an embodiment, the audio hole 1420 may connect the inner space 1410 to the outside of the electronic device 500. For example, the audio hole 1420 may extend in a direction parallel to a direction (e.g., +z direction) from one surface 530*c* of the display 530 toward the other surface 530*d* of the display. Audio output from the audio module (e.g., audio module 170 of FIG. 1) of the electronic device 500 may pass through the inner space 1410 and the audio hole 1420 to be transmitted to the outside of the electronic device 500.

As described above, the electronic device 500 according to an embodiment may provide a structure that reduces the manufacturing cost of the electronic device 500, since the support 1400 supporting the display 530 forms the outer surface of the electronic device 500. For example, in order to surround a part of the second housing 520, the size of the support 1400 may be relatively increased. As the size of the support 1400 increases, the decoration member (e.g., decoration member 540 of FIGS. 5A and 5B) may be omitted in the electronic device 500 according to an embodiment. As the decoration member 540 is omitted, the electronic device 500 has a relatively simple structure, and thus the manufacturing cost of the electronic device 500 may be reduced.

Figure 15:
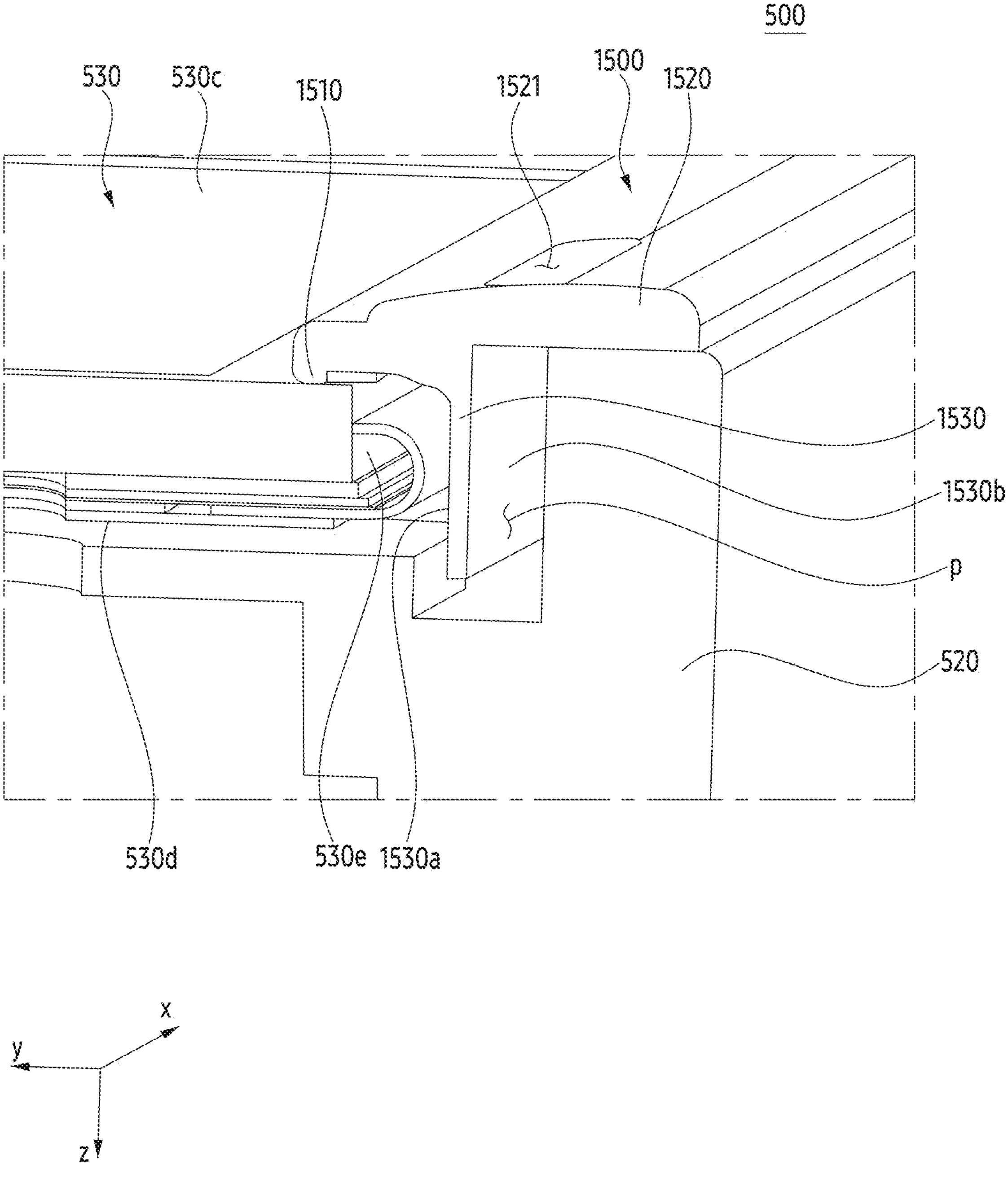
FIG. 15 is a partial cross-sectional view of an electronic device according to an embodiment.

FIG. 15 is a partial cross-sectional view of an electronic device according to an embodiment.

Referring to FIG. 15, an electronic device 500 according to an embodiment may include a support 1500. The support 1500 of FIG. 15 may be a support 1500 in which the structure of the support 600 of FIGS. 5A and 5B is changed, and thus the overlapping description thereof will be omitted.

According to an embodiment, the support 1500 may include a supporting protrusion 1510, a first extending portion 1520, and a third extending portion 1530. The supporting protrusion 1510 of FIG. 15 may be substantially the same as the supporting protrusion 610 of FIG. 5B, and thus the overlapping description thereof will be omitted. According to an embodiment, the supporting protrusion 1510 may prevent the display 530 from being separated from the second housing 520 by at least partially contacting the display 530.

According to an embodiment, at least one supporting protrusion 1510 may be formed in the first extending portion 1520, and the first extending portion 1520 may extend in a first direction (e.g., +y direction). For example, the first extending portion 1520 may extend from one surface 530*c* of the display 530 to the second housing 520. The first extending portion 1520 may cover a part of the second housing 520. According to an embodiment, the first extending portion 1520 may include an audio hole 1521. The audio hole 1521 may provide a path through which audio output from an audio module of the electronic device 500 (e.g., audio module 170 of FIG. 1) is transmitted to the outside of the electronic device 500.

According to an embodiment, the third extending portion 1530 may extend vertically with respect to the first extending portion 1520 and be inserted into the second housing 520. For example, the third extending portion 1530 may extend, from the first extending portion 1520, into the inside of the second housing 520 along a direction (e.g., +z direction) parallel to a direction facing the other surface 530*d* of the display 530 from one surface 530*c*. One surface 1530*a* of the third extending portion 1530 facing the second direction (e.g., −y direction) may face the side surface 530*e* of the display 530. For example, one surface 1530*a* of the third extending portion 1530 may face a part of the board 532 protruding from the side surface 530*e* of the display 530. The other surface 1530*b* of the third extending portion

1530 facing the first direction (e.g., +y direction) may face the audio path p through which the audio output from the audio module 170 passes. The audio path p may be connected to the audio hole 1521.

As described above, the electronic device 500 according to an embodiment may provide a structure capable of reducing the manufacturing cost of the electronic device 500 by the support 1500 having a relatively simple structure.

According to an embodiment, the electronic device (e.g., electronic device 500 of FIGS. 5A and 5B) comprises a first housing (e.g., first housing 510 of FIGS. 5A and 5B) and a second housing (e.g., second housing 520 of FIG. 5A and FIG. 5B). The second housing (e.g., second housing 520 of FIG. 5A and FIG. 5B) may be coupled to the first housing so as to be slidable along a first direction or a second direction opposite to the first direction with respect to the first housing; a flexible display (e.g., display 530 of FIGS. 5A and 5B) coupled to the second housing so that the second housing expands as it moves in the first direction, or the second housing reduces as it moves in the second direction. The electronic device includes a support (e.g., support 600 of FIG. 5B) into which at least a part is inserted into the second housing to surround a periphery of the flexible display facing the first direction (e.g., periphery 533 of FIG. 5B). The support includes a plurality of supporting protrusions (e.g., supporting protrusions 610 of FIG. 5B) spaced apart from each other on one side of the flexible display (e.g., one side 530*b* of FIG. 5B) and contacting the periphery of the flexible display. Thereby, a structure is provided that reduces the possibility of damage to the display because the contact area between the support and the display is minimized due to the contact being made by the supporting protrusions instead of an entire areal contact of the support. According to an embodiment, the flexible display may include a first region (e.g., a first region 530*a* of FIG. 5B) that forms a plane and extends from a first periphery (e.g., the first periphery 521*a* of FIG. 5B) of the second housing accommodating the support, and a second region (e.g., second region 530*b* of FIG. 5B) having a curvature at a second periphery facing the first periphery (e.g., second periphery 521*b* of FIG. 5B). According to an embodiment, each of the plurality of the supporting protrusion includes a first portion (e.g., first portion 611 of FIGS. 6A and 6B), in contact with the one surface of the flexible display; and a second portion (e.g., second portion 612 of FIGS. 6A and 6B) connected to the first portion and spaced apart from the one surface of the flexible display. Since the contact area is reduced due the second portion being spaced apart, the possibility of damage to the display is reduced due to less friction. The second portion may have a slope with respect to the one surface of the flexible display.

According to an embodiment, the flexible display may include a display panel (e.g., display panel 531 of FIG. 5B); and a board (e.g., board 532 of FIG. 5B) protruding from a side surface (e.g., side surface 531*c* of FIG. 5B) of the display panel, and bent toward the other surface (e.g., the other surface 531*b* of FIG. 5B) of the display panel facing one surface (e.g., one surface 531*a* of FIG. 5B) of the display panel, and wherein the support may surround the side surface of the display panel and be spaced apart from the side surface of the display panel. Thereby, the support may provide a space for the board to be bent at the side surface.

According to an embodiment, the support may further include a first extending portion (e.g., first extension portion 620 of FIG. 5B) on which the plurality of the supporting protrusions formed, and extending on one surface of the flexible display along the first direction; a second extending portion (e.g., second extending portion 630 of FIG. 5B) extending along the first direction on the other surface (e.g., other surface 530*b* of FIG. 5B) of the flexible display facing the one surface of the flexible display above; and a connecting portion (e.g., connecting portion 640 of FIG. 5B) connecting the first extending portion and the second extending portion, and vertical to the first extending portion and the second extending portion.

According to an embodiment, the support may include a first extending portion (e.g., first extension 1520 of FIG. 15) on which the plurality of the supporting protrusions formed, the first extending portion extending along the first direction; and a third extending portion (e.g., third extension 1530 of FIG. 15) extending vertically with respect to the first extending portion and inserted into the second housing.

According to an embodiment, the electronic device further includes a speaker (e.g., audio module 170 of FIG. 1) disposed in the second housing, and the support may further include an audio hole (e.g., audio hole 1420 of FIG. 14) penetrating the support to transmit the audio output from the speaker to the outside of the electronic device.

According to an embodiment, a decoration member (e.g., decoration member 540 of FIGS. 5A and 5B) disposed on the support may be further included.

According to an embodiment, the support may form at least a part of an outer surface of the electronic device facing the first direction. This structure can be readily manufactured and reduces manufacturing costs since a decoration member may be omitted. As the decoration member is omitted, the electronic device has a relatively simple structure, and thus the manufacturing cost of the electronic device may be reduced.

According to an embodiment, the second portion may extend from the first portion along the first direction, a distance between the second portion and one surface of the flexible display may increase along the first direction from a point in contact with the first portion and the second portion.

According to an embodiment, a side surface of the flexible display facing the first direction and vertical to the one surface of the flexible display (e.g., side surface 530*e* of FIG. 5B) may be adjacent to the second portion among the first portion and the second portion. As the point at which the support and the display are in contact is formed close to the side surface of the display, scratches that may be generated by the support may be covered by the support and may not be visible from the outside.

According to an embodiment, a first portion may include a plane contact surface (e.g., a contact surface 611*a* of FIG. 6B) that is in contact with the one surface of the flexible display and extends in a third direction vertical to the first direction.

According to an embodiment, the first portion may include a curved surface (e.g., first curved surface 611*b* of FIG. 8) having a curvature, extending in the first direction, and contacting the one surface of the flexible display. A contact area between the display and the support by the first portion may be reduced due to the formation of a line contact. Thus, friction between the display and the support may be reduced.

According to an embodiment, each of the plurality of supporting protrusions may further include a third portion connected to the first portion and spaced apart from the one surface of the flexible display (e.g., third portion 613 of FIG. 9). According to an embodiment, a distance spaced apart in the first direction from the side surface of the flexible display to the first portion may be shorter than a distance spaced apart in the first direction from the side surface of the flexible display to the third portion. Due to the third portion, a contact point between the display and the support can be close to the side surface of the display so that the scratches that may be generated by the support may be covered by the support and may not be visible from the outside.

According to an embodiment, at least one of the third portion and the second portion may be bent with respect to the first portion.

According to an embodiment, at least one of the plurality of supporting protrusions may have a cylinder shape extending along the first direction.

According to an embodiment, the second housing may include a conductive portion (e.g., conductive portion 520*e* of FIGS. 11A and 11B) operating as an antenna radiator. According to an embodiment, the support may further include an extending protrusion (e.g., extending protrusion 670 of FIG. 11A and FIG. 11B) extending from one surface of the support facing the first direction (e.g., one surface 600*a* of FIG. 11A and FIG. 11B) toward the second housing. Due to the extending protrusion a distance between the display and the conductive portion operating as an antenna may increase.

According to an embodiment, the extending protrusion may include a plurality of extending protrusions spaced apart from each other in a third direction vertical to the first direction. According to an embodiment, the support may further include an air gap (e.g., air gap g of FIGS. 11A and 11B) disposed between the plurality of extending protrusions.

The extending protrusions may secure a separation distance between the display and the conductive portion operating as an antenna radiator to secure the performance of the antenna.

According to an embodiment, one region (e.g., first region 601 of FIGS. 12A and 12B) of the support surrounding the flexible display may have a shape corresponding to the shape of the flexible display. According to an embodiment, the support may further include a reinforcing protrusion (e.g., reinforcing protrusion 680 of FIGS. 12A and 12B) protruding from one surface of the support facing the first direction. This reinforces the rigidity of the support when having reduced thickness to provide a corresponding shape.

According to an embodiment, the reinforcing protrusion may extend between both peripheries of the support spaced apart along a third direction vertical to the first direction.

According to an embodiment, the electronic device may further include a sealing member (e.g., sealing member 700 of FIG. 10) extending along a third direction vertical to the first direction, in contact with the support, and spaced apart from the flexible display. The sealing member block a foreign object from being entered through the space between the support and the one surface of the display.

According to an embodiment, the support may further include a at least one conductive layer disposed on inner surface (e.g., inner surface 600*b* of FIG. 13A) of the support facing the one surface of the flexible display, at least part of the at least one conductive layer (e.g., conductive layers 690 of FIGS. 13A and 13B) is in contact with the second housing. The conductive layer may reduce inflow of static electricity into the display.

According to an embodiment, the at least one conductive layer may include a first conductive layer (e.g., first conductive layer 691 of FIGS. 13A and 13B) spaced apart from the plurality of supporting protrusions and surrounding a part of the plurality of supporting protrusions; and a second conductive layer (e.g., second conductive layer 692 of FIGS. 13A and 13B) connected to the first conductive layer, and disposed at the second periphery (e.g., second periphery 603 of FIGS. 13A and 13B) of the support vertical to the first periphery (e.g., first periphery 602 of FIGS. 13A and 13B) of the support in which the plurality of supporting protrusions are disposed. This may reduce damage to the display through the conductive layer of the support which reduces the transmission of static electricity to the display.

According to an embodiment, the second housing may include a conductive region (e.g., conductive region 523 of FIGS. 13A and 13B) spaced apart from the flexible display and disposed in a part of the second housing facing the second periphery of the support. According to an embodiment, at least a part of the conductive layer may be in contact with the conductive region.

According to an embodiment, an electronic device (e.g., electronic device 500 of FIG. 5A and FIG. 5B) may comprise a first housing (e.g., first housing 510 of FIGS. 5A and 5B); a second housing (e.g., second housing 520 of FIGS. 5A and 5B) that is coupled to the first housing so as to be pulled out from the first housing or to move along a second direction opposite to the first direction and be inserted into the first housing by moving along the second direction with respect to the first housing; and a flexible display (e.g., displays 530 of FIGS. 5A and 5B) coupled to the second housing so that the second housing expands as it moves in the first direction or reduces as the second housing moves in the second direction. According to an embodiment, an electronic device may comprise support (e.g., support 600 in FIG. 5B) disposed to the second housing to surround a periphery (e.g., periphery 533 of FIG. 5B) of the flexible display facing the first direction and including at least a part of a plurality of supporting protrusions in contact with an one surface (e.g., one surface 530*b* of FIG. 5B) of the flexible display, the plurality of supporting protrusions (e.g. supporting protrusions 610 of FIG. 5B) is spaced apart from each other on the one surface of the flexible display. According to an embodiment the support may further includes a first extending portion (e.g., first extending portion 620 of FIG. 5B) on which the plurality of the supporting protrusions formed, the first extending portion extending along the first direction; a second extending portion (e.g., second extending portion 630 of FIG. 5B) facing an another surface of the flexible display facing the one surface of the flexible display, the second extending portion extending along the first direction; and a connecting portion (e.g., connecting portion 640 of FIG. 5B) vertical to the first extending portion and the second extending portion, and connecting the first extending portion and the second extending portion.

According to an embodiment, each of the plurality of the supporting protrusion may include a first portion (e.g., first portion 611 of FIGS. 6A and 6B) in contact with the one surface of the flexible display; and a second portion (e.g., second portion 612 of FIGS. 6A and 6B) connected to the first portion and spaced apart from the one surface of the flexible display.

According to an embodiment, each of the plurality of supporting protrusions may further include a third portion connected to the first portion and spaced apart from the one surface of the flexible display. According to an embodiment, the first portion may be disposed between the second portion and the third portion (e.g., third portion 613 of FIG. 9).

According to an embodiment, at least one of the plurality of supporting protrusions may include a contacting surface (e.g., contacting surface 611*a* of FIG. 6B) in contact with the one surface of the flexible display and extending along a third direction vertical to the first direction to parallel with the one surface of the flexible display.

According to an embodiment, at least one of the plurality of supporting protrusions may include a curved surface (e.g., first curved surface 611*b* of FIG. 8) having a curvature, extending in the first direction, and contacting the one surface of the flexible display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. An electronic device comprising:

a first housing;

a second housing movably coupled to the first housing, wherein the second housing is configured to:

move in a first direction with respect to the first housing to transition the electronic device into an extended state, and move in a second direction opposite to the first direction with respect to the first housing to transition the electronic device into a retracted state;

a flexible display coupled to the first housing and the second housing, the flexible display including:

a first region, and a second region extending from the first region, wherein the second region is drawn into or drawn out of the first housing based on movement of the second housing; and a support disposed in the second housing and configured to surround a peripheral edge portion of the flexible display facing the first direction, wherein the support includes a plurality of supporting protrusions, plurality of supporting protrusions configured to contact on a front surface of the peripheral edge portion of the flexible display and stabilize the peripheral edge portion of the flexible display during movement of the second housing, and wherein the plurality of supporting protrusions are spaced apart from each other on the front surface of the flexible display.

2. The electronic device of claim 1, wherein the flexible display includes:

a display panel, and a board extending from a side surface of the display panel vertical to the front surface of the display panel configured to emit light to an outside of the electronic device, the board being bent toward another surface of the display panel facing the front surface of the display panel, and wherein the support surrounds at least part of the board.

3. The electronic device of claim 1, wherein the support further includes:

a first extending portion on which the plurality of the supporting protrusions is formed, the first extending portion extending along the first direction;

a second extending portion facing another surface of the flexible display facing the front surface of the flexible display, the second extending portion extending along the first direction; and a connecting portion connecting the first extending portion and the second extending portion.

4. The electronic device of claim 1, wherein the support includes:

a first extending portion on which the plurality of the supporting protrusions is formed, the first extending portion extending along the first direction; and a third extending portion extending vertically with respect to the first extending portion and being inserted into the second housing.

5. The electronic device of claim 1, wherein the second housing includes:

a first covering portion in contact with a surface of the support facing the first direction, and a second covering portion in contact with the flexible display and coupled to the first covering portion, and wherein the support supports the second covering portion by being in contact with the second covering portion.

6. The electronic device of claim 1, wherein each of the plurality of the supporting protrusions includes:

a first portion in contact with the front surface of the flexible display, and a second portion connected to the first portion and spaced apart from the front surface of the flexible display, and wherein the second portion has a slope with respect to the front surface of the flexible display.

7. The electronic device of claim 6, wherein a side surface of the flexible display is close to the second portion among the first portion and the second portion, the side surface of the flexible display facing the first direction vertical to the front surface of the flexible display.

8. The electronic device of claim 6, wherein the first portion includes a contact surface in contact with the front surface of the flexible display, the first portion extending along a third direction vertical to the first direction to be parallel with the front surface of the flexible display, or wherein the first portion includes a curved surface in contact with the front surface of the flexible display and the first portion extending along the first direction having a curvature.

9. The electronic device of claim 6, wherein each of the plurality of the supporting protrusions further includes a third portion connected to the first portion and spaced apart from the front surface of the flexible display, and wherein the first portion is disposed between the second portion and the third portion.

10. The electronic device of claim 1, wherein the second housing includes a conductive portion operating as an antenna radiator, and wherein the support further includes an extending protrusion extending from a surface of the support facing the first direction to the second housing along the first direction.

11. The electronic device of claim 10, wherein the extending protrusion includes a plurality of extending protrusions spaced apart from each other along a third direction vertical to the first direction, wherein the support is spaced apart from the second housing in sections between the plurality of the extending protrusions.

12. The electronic device of claim 1, wherein a region of the support surrounding the flexible display has a shape which corresponds to a shape of a side surface of the flexible display, and wherein the support further includes a reinforcing protrusion protruding from a surface of the support facing the first direction.

13. The electronic device of claim 1, further including:

a sealing member interposed between the support and the front surface of the flexible display, the sealing member extending along a third direction vertical to the first direction to be parallel with the front surface of the flexible display.

14. The electronic device of claim 1, wherein the support further includes:

at least one conductive layer disposed on an inner surface of the support facing the front surface of the flexible display; and at least part of the at least one conductive layer is in contact with the second housing.

15. The electronic device of claim 14, wherein the plurality of supporting protrusions is disposed on a first periphery of the support, wherein the at least one conductive layer includes:

a first conductive layer spaced apart from the plurality of supporting protrusions and surrounding a part of the plurality of supporting protrusions, and a second conductive layer connected to the first conductive layer and disposed on a second periphery of the support vertical to the first periphery, wherein the second housing includes a conductive region disposed on a part of the second housing facing the second periphery of the support and spaced apart from the flexible display, and wherein at least part of the at least one conductive layer is in contact with the conductive region.

16. An electronic device comprising:

a first housing;

a second housing pulled out from the first housing by moving along a first direction with respect to the first housing, or inserted into the first housing by moving along a second direction opposite to the first direction;

a flexible display including a display region that is configured to expand as the second housing slides along the first direction, or reduce as the second housing slides along the second direction; and a support disposed in the second housing to surround a periphery of the flexible display facing the first direction and including a plurality of supporting protrusions spaced apart from each other on one surface of the flexible display, at least a part of the plurality of supporting protrusions in contact with the one surface of the flexible display, the one surface of the flexible display on a same side of the flexible display as the display region, wherein the support further includes:

a first extending portion on which the plurality of the supporting protrusions is formed, the first extending portion extending along the first direction, a second extending portion facing another surface of the flexible display facing the one surface of the flexible display, the second extending portion extending along the first direction, and a connecting portion connecting the first extending portion and the second extending portion.

17. The electronic device of claim 16, wherein each of the plurality of the supporting protrusions includes:

a first portion in contact with the one surface of the flexible display; and a second portion connected to the first portion and spaced apart from the one surface of the flexible display, the second portion having a slope with respect to the one surface of the flexible display.

18. The electronic device of claim 17, wherein the first portion includes a contact surface in contact with the one surface of the flexible display, the first portion extending along a third direction vertical to the first direction to be parallel with the one surface of the flexible display, or wherein the first portion includes a curved surface in contact with the one surface of the flexible display and the first portion extending along the first direction having a curvature.

19. The electronic device of claim 17, wherein each of the plurality of the supporting protrusions further includes a third portion connected to the first portion and spaced apart from the one surface of the flexible display, and wherein the first portion is disposed between the second portion and the third portion.

20. The electronic device of claim 16, wherein at least one of the plurality of supporting protrusions includes a contacting surface in contact with the one surface of the flexible display and extending along a third direction vertical to the first direction to be parallel with the one surface of the flexible display.

* * * * *